(12) United States Patent
Farrell et al.

(10) Patent No.: US 12,298,551 B1
(45) Date of Patent: May 13, 2025

(54) METHODS FOR CORRECTING SUBSTRATE THICKNESS VARIATION FOR WAVEGUIDE APPLICATIONS

(71) Applicant: Meta Platforms Technologies, LLC, Menlo Park, CA (US)

(72) Inventors: Richard Farrell, Seattle, WA (US); Siddharth Buddhiraju, Palo Alto, CA (US); Jilin Yang, Redmond, WA (US); Pasqual Rivera, Woodinville, WA (US); Anneli Munkholm, Wailea, HI (US); Keith Rozenburg, Bellevue, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 532 days.

(21) Appl. No.: 17/830,276

(22) Filed: Jun. 1, 2022

(51) Int. Cl.
  *F21V 8/00* (2006.01)
  *G02B 27/01* (2006.01)
(52) U.S. Cl.
  CPC ......... *G02B 6/0065* (2013.01); *G02B 6/0016* (2013.01); *G02B 6/0038* (2013.01); *G02B 27/0172* (2013.01)
(58) Field of Classification Search
  CPC .. G02B 6/0065; G02B 6/0016; G02B 6/0038; G02B 27/0172
  See application file for complete search history.

(56) References Cited

U.S. PATENT DOCUMENTS

| | | |
|---|---|---|
| 7,512,297 B2 | 3/2009 | Farah |
| 8,604,562 B2 | 12/2013 | Wang |
| 10,732,351 B2 | 8/2020 | Colburn et al. |
| 2012/0034426 A1 | 2/2012 | Webb et al. |
| 2021/0124108 A1 | 4/2021 | Lee |

(Continued)

FOREIGN PATENT DOCUMENTS

KR  102476775 B1 * 12/2022

OTHER PUBLICATIONS

Ghoumid K., et al., "Optical Performance of Bragg Gratings Fabricated in Ti:LiNbO3 Waveguides by Focused Ion Beam Milling," Journal of Lightwave Technology, Dec. 2010, vol. 28, No. 23, 6 pages.

(Continued)

*Primary Examiner* — Phu Vu
(74) *Attorney, Agent, or Firm* — Greenberg Traurig, LLP

(57) ABSTRACT

Disclosed herein are techniques for waveguide displays. According to some embodiments, a method for fabricating a multi-layer optical device comprising includes measuring thickness variations within a target area of a first substrate for fabricating a first optical element of the multi-layer optical device and determining, based on the measuring, a thickness correction map indicating amounts of material to be removed in different regions of the target area to planarize the target area. The method also includes planarizing the target area of the first substrate based on the thickness correction map and bonding the first substrate to a second substrate that comprises a second optical element fabricated thereon to form a layer stack, wherein the target area of the first substrate aligns with and is bonded to the second optical element to form a multi-layer structure. The method further includes singulating the multi-layer structure from the layer stack.

20 Claims, 16 Drawing Sheets

(56) References Cited

U.S. PATENT DOCUMENTS

2023/0131948 A1* 4/2023 Konoshita ............ G02B 6/0016
 385/37
2023/0375774 A1* 11/2023 Soldi .................... G02B 6/0065

OTHER PUBLICATIONS

Gierak J., "Focused Ion Beam Technology and Ultimate Applications," Semiconductor Science and Technology, Mar. 20, 2009, vol. 24, 23 pages.

Kim Y.S., et al., "Advanced Wafer Thinning Technology and Feasibility Test for 3D Integration," Microelectronic Engineering, 2013, vol. 107, pp. 65-71.

Song JB., et al., "Interferometric Total Thickness Variation Measurement of Glass Wafer," Proceedings vol. 6723, 3rd International Symposium on Advanced Optical Manufacturing and Testing Technologies: Optical Test and Measurement Technology and Equipment, Jan. 17, 2008, 8 pages.

* cited by examiner

METHODS FOR CORRECTING SUBSTRATE THICKNESS VARIATION FOR WAVEGUIDE APPLICATIONS

BACKGROUND

An artificial reality system, such as a head-mounted display (HMD) or heads-up display (HUD) system, generally includes a near-eye display configured to present content to a user via an electronic or optic display that is within, for example, about 10-20 mm in front of the user's eyes. The near-eye display may be in the form of, for example, a headset or a pair of glasses. The near-eye display may display virtual objects or combine images of real objects with virtual objects, as in virtual reality (VR), augmented reality (AR), or mixed reality (MR) applications. For example, in an AR system, a user may view both images of virtual objects (e.g., computer-generated images (CGIs)) and the surrounding environment by, for example, seeing through transparent display glasses or lenses (often referred to as optical see-through).

One example of an optical see-through AR system may use a waveguide-based optical display, where light of projected images may be coupled into a waveguide (e.g., a transparent substrate), propagate within the waveguide, and be coupled out of the waveguide at multiple locations towards a user's eye. In some implementations, the light of the projected images may be coupled into or out of the waveguide using diffractive optical elements, such as gratings, which may allow light from the surrounding environment to pass through a see-through region of the waveguide to reach the user's eye without being diffracted.

SUMMARY

This disclosure relates generally to waveguide displays. More specifically, techniques disclosed herein relates to waveguide display devices with reduced local and wafer level total thickness variation (TTV) and wedge angle, and methods of fabricating the same. Various inventive embodiments are described herein, including devices, systems, methods, materials, processes, and the like.

According to some embodiments, a method for fabricating a multi-layer optical device comprising includes measuring thickness variations within a target area of a first substrate for fabricating a first optical element of the multi-layer optical device and determining, based on the measuring, a thickness correction map indicating amounts of material to be removed in different regions of the target area to planarize the target area. The method also includes planarizing the target area of the first substrate based on the thickness correction map and bonding the first substrate to a second substrate that comprises a second optical element fabricated thereon to form a layer stack, wherein the target area of the first substrate aligns with and is bonded to the second optical element to form a multi-layer structure. The method further includes singulating the multi-layer structure from the layer stack.

According to certain embodiments, a waveguide display device includes a first waveguide layer characterized by a total thickness variation (TTV) equal to or less than 1 µm (e.g., less than about 0.5 µm, less than about 0.2 µm, or less than about 0.1 µm) and an area greater than 0.1 cm$^2$ (e.g., greater than about 1 cm$^2$, greater than about 4 cm$^2$, or greater than about 10 cm$^2$), and a second waveguide layer bonded to the first waveguide layer and characterized by a total thickness variation equal to or less than 1 µm (e.g., less than about 0.5 µm, less than about 0.2 µm, or less than about 0.1 µm) and an area greater than 0.1 cm$^2$ (e.g., greater than about 1 cm$^2$, greater than about 4 cm$^2$, or greater than about 10 cm$^2$). The waveguide display device also includes an input granting formed in or on the first waveguide layer or the second waveguide layer, the input grating configured to couple display light into the waveguide display device and an output grating formed in or on the first waveguide layer or the second waveguide layer, the output grating configured to couple the display light out of the waveguide display device.

According to certain embodiments, an engineered substrate includes an array of planarized areas, where each planarized area of the array of planarized areas is characterized by an area greater than about 0.1 cm$^2$ and a local total thickness variation equal to or less than about 1 µm. A width of the engineered substrate is greater than about 10 cm (4", such as about 6", about 8", about 10", about 12", or up to about 70 cm), a total thickness variation of areas of the engineered substrate outside of the array of planarized areas is greater than about 1 µm, and the engineered substrate is transparent to visible light.

According to certain embodiments, a method for fabricating a multi-layer optical device includes measuring thickness variations within a target area of a first substrate for fabricating a first optical element of the multi-layer optical device and determining, based on the measuring, a thickness correction map indicating amounts of material to be removed in different regions of the target area to planarize the target area. The method also includes planarizing the target area of the first substrate based on the thickness correction map, and singulating the target area of the first substrate. The method further includes bonding the singulated target area of the first substrate with a target area singulated from the first substrate or a second substrate that includes a second optical element fabricated thereon to form a multi-layer structure.

According to certain embodiments, a waveguide display layer may be characterized by a local total thickness variation (TTV) equal to or less than about 1 µm (e.g., less than about 0.5 µm, less than about 0.2 µm, or less than about 0.1 µm) and an area greater than about 0.1 cm$^2$ (e.g., greater than about 1 cm$^2$, greater than about 4 cm$^2$, or greater than about 10 cm$^2$). A thickness of the waveguide display layer may be equal to or less than about 600 µm. In some embodiments, the waveguide display layer may include a grating formed in or on the waveguide display layer.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

Illustrative embodiments are described in detail below with reference to the following figures.

Figure 1:
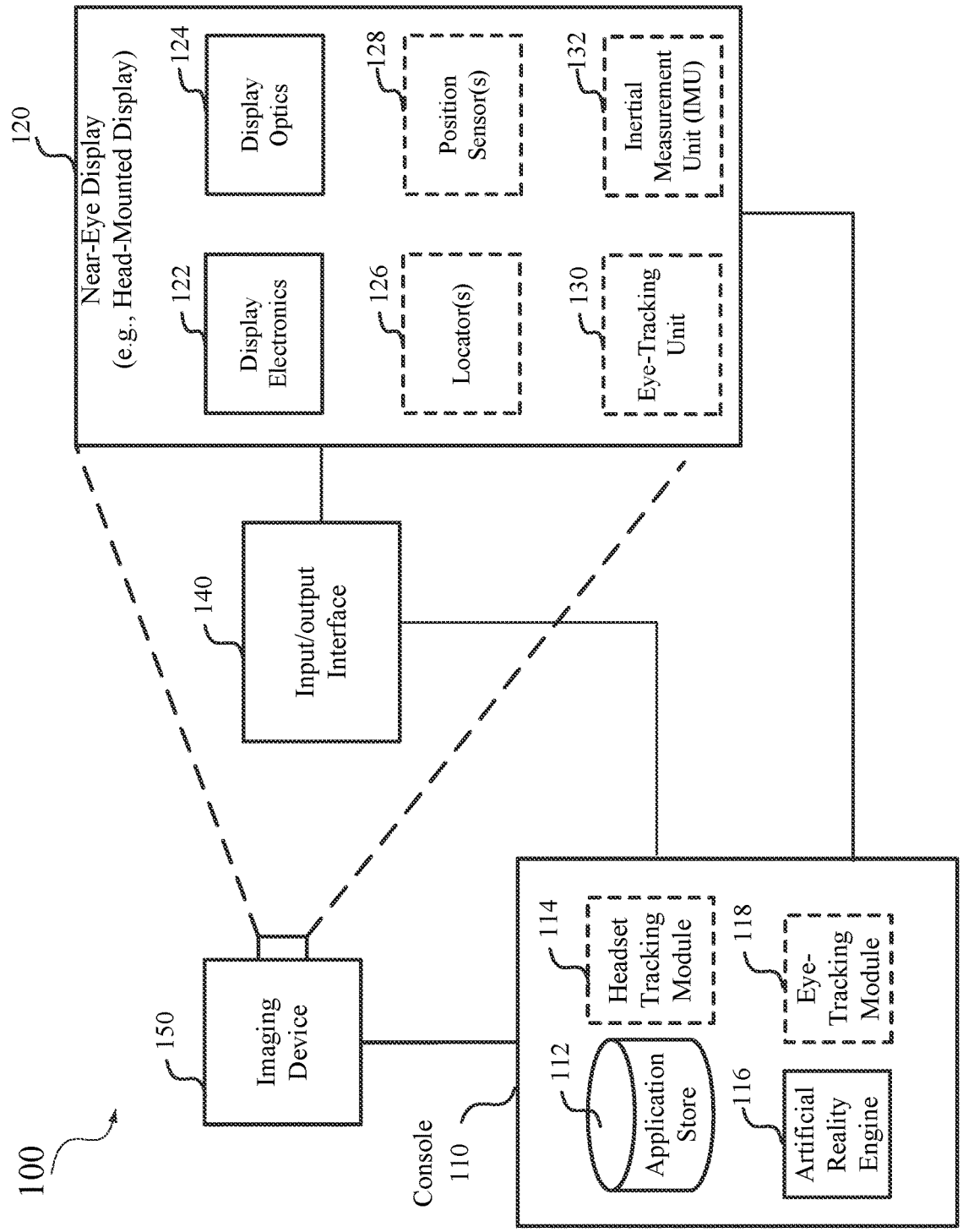
FIG. 1 is a simplified block diagram of an example of an artificial reality system environment including a near-eye display according to certain embodiments.

The figures depict embodiments of the present disclosure for purposes of illustration only. One skilled in the art will readily recognize from the following description that alternative embodiments of the structures and methods illustrated may be employed without departing from the principles, or benefits touted, of this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Techniques disclosed herein relate generally to waveguide displays. More specifically, and without limitation, disclosed herein are multi-layer waveguide display devices with reduced local TTV and local wedge angle and the method of fabricating the multi-layer waveguide display devices. Various inventive embodiments are described herein, including devices, systems, methods, materials, processes, and the like.

In an optical see-through waveguide display system, display light may be coupled into a waveguide (e.g., a substrate) by input couplers (e.g., grating couplers), propagate within the waveguide (e.g., through total internal reflections), and then be coupled out of the waveguide at different locations by one or more output couplers, such as grating couplers, towards user's eyes, to replicate exit pupils and expand the eyebox. Two or more gratings may be used to expand the eyebox in two dimensions. The waveguide and the couplers may be transparent to ambient light such that the user can also view the ambient environment through the waveguide display. Because the display light travels within the waveguide by bouncing between the surfaces of a substrate (e.g., a top surface of the substrate and a bottom surface of the substrate) for multiple times (e.g., about 20-30 times), the performance of the waveguide display can be negatively impacted by the thickness variation of the substrates in many ways including, but not limited to, chief ray angle shift, modulation transfer function degradation, lateral color aberration, pupil swim, text breaks, and double images.

Also, in some waveguide displays, due to the different diffraction angles and different diffraction efficiencies, display light from different fields of view or in different colors may not be uniformly coupled out of the waveguide towards user's eyes. In some embodiments, a multi-layer waveguide may be used to improve the uniformity of the display light from different fields of view or in different colors. The multi-layer waveguide may have a layer stack including multiple waveguide layers having different refractive indices and/or thicknesses. Any waveguide layer having a wedge shape and/or a high TTV in the multi-layer waveguide may degrade the performance of the waveguide display as described above. Accordingly, having a precise thickness control in each waveguide layer of the multi-layer waveguide may be desired in order to enhance the performance of the multi-layer waveguide.

Some correction techniques can be used to control the thickness variation of the waveguide substrate, thereby reducing the TTV and/or wedges of a substrate for fabricating waveguide devices. However, these correction techniques generally polish and grind the substrate with some post-treatments to reduce TTV and/or wedges, and focus on a global correction of the entire substrate. For example, the substrate may be adhered onto a support plate and be thinned down by grinding and polishing using a grinder wheel. In some correction techniques, post-treatments such as Ultra Poligrind (UPG), Chemical Mechanical Planarization (CMP), and Dry Polishing (DP) may be performed on the grinded wafer. However, grinding and the post-treatment techniques may be slow and complex to implement. In addition, due to, for example, wafer bowing during the grinding, global wafer grinding may still leave a high global/local TTV after the correction. For example, the resultant substrate may have a global TTV larger than 1 μm and/or a global wedge larger than 1 arcsec, which may not be sufficient for achieving the desired performance. In some correction techniques, to further reduce the TTV, the contact angle between the grinder wheel and the support plate may need to be adjusted and optimized during the grinding, where, after grinding a certain amount of the substrate material, the TTV of the substrate may be measured, for example, using non-contact gauge (NCG), to determine the new contact angle, and then the support plate or the grinder wheel may need to be tilted based on the new contact angle for further grinding. This technique may be more complicated, may need precise measurement and control, and may be slow. In addition, it can be very challenging to planarize a thin substrate (e.g., with a thickness below about 600 or 500 µm) using the grinding techniques.

According to certain embodiments of the techniques disclosed herein, a localized correction process may be performed to correct target areas where waveguide display devices (e.g., surface-relief structures or waveguide layers) will be formed. For example, an interferometer may be used to measure local and/or global TTVs of the substrate (e.g., the relative thicknesses of different regions within each target area of the substrate), and a thickness correction map may be generated based on the measurement. Then, an etching process (e.g., an ion beam etching process or gas cluster ion beam etching process) may be performed to etch target areas of the substrate according to the thickness correction map. For example, the ion beam may scan across different regions of each target area, where the duration of the ion beam at each region of the target area may be determined based on the amount of material to be removed at the region, which may be determined based on the thickness correction map. In some embodiments, post processing such as wet chemistry and/or thermal annealing may be performed on the etched substrate to remove etch residues or substrate surface damages. In some embodiments, the planarized target areas of the substrate may then be processed through a series of deposition, lithographic patterning, and etching to fabricate waveguide display devices (e.g., grating couplers) in the target areas with improved local TTV.

Techniques disclosed herein may be applied to any suitable transparent substrates, such as a transparent substrate with a refractive index (RI) between about 1.4 and about 2.7 or higher (e.g., fused silica, $LiNiBO_3$, SiC, and high index glass). After the correction, the thickness of the target areas of the substrate may be more precisely controlled. For example, a local TTV of the target area of the substrate and thus a TTV of the fabricated waveguide display device) can be less than about 1 µm or a wedge of the fabricated waveguide display device can be less than about 1 arcsec. Therefore, the performance of the waveguide display device may be improved.

The techniques disclosed herein can also be used for fabricating a waveguide display device having a multi-layer structure. For example, the substrate for fabricating each layer of the multi-layer structure can be individually corrected using the disclosed techniques and then be stacked together (e.g., by aligning/matching the corresponding target areas) to form the multi-layer structure, before being singulated (e.g., through a dicing process) to form the multi-layer waveguide display device. Accordingly, wafer-level bonding and one dicing step may be performed to form multiples individual multi-layer waveguide display devices from the substrates. In some embodiments, there is no need to dice each waveguide layer and bond the waveguide layer to another waveguide layer. Therefore, in addition to the improve performance due to the low TTV, the productivity and yield of the multi-layer waveguide display devices may also be improved.

In some embodiments, the substrate for fabricating each layer of the multi-layer structure can be individually corrected using the disclosed techniques, and individual target areas may be singulated (e.g., through a dicing process) before being stacked, and bonded or laminated together to form the multi-layer waveguide display device. In some embodiments, two target areas singulated from one or two substrates and having opposite thickness variations or wedge angles may be selected and stacked such that they may compensate the thickness variation of each other to form a layer stack with a low total thickness variation or a small wedge angle.

In the following description, for the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples. The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as "example" is not necessarily to be construed as preferred or advantageous over other embodiments or designs.

FIG. 1 is a simplified block diagram of an example of an artificial reality system environment 100 including a near-eye display 120 in accordance with certain embodiments. Artificial reality system environment 100 shown in FIG. 1 may include near-eye display 120, an optional external imaging device 150, and an optional input/output interface 140, each of which may be coupled to an optional console 110. While FIG. 1 shows an example of artificial reality system environment 100 including one near-eye display 120, one external imaging device 150, and one input/output interface 140, any number of these components may be included in artificial reality system environment 100, or any of the components may be omitted. For example, there may be multiple near-eye displays 120 monitored by one or more external imaging devices 150 in communication with console 110. In some configurations, artificial reality system environment 100 may not include external imaging device 150, optional input/output interface 140, and optional console 110. In alternative configurations, different or additional components may be included in artificial reality system environment 100.

Near-eye display 120 may be a head-mounted display that presents content to a user. Examples of content presented by near-eye display 120 include one or more of images, videos, audio, or any combination thereof. In some embodiments, audio may be presented via an external device (e.g., speakers and/or headphones) that receives audio information from near-eye display 120, console 110, or both, and presents audio data based on the audio information. Near-eye display 120 may include one or more rigid bodies, which may be rigidly or non-rigidly coupled to each other. A rigid coupling between rigid bodies may cause the coupled rigid bodies to act as a single rigid entity. A non-rigid coupling between rigid bodies may allow the rigid bodies to move relative to each other. In various embodiments, near-eye display 120 may be implemented in any suitable form-factor, including a pair of glasses. Some embodiments of near-eye display 120 are further described below with respect to FIGS. 2 and 3. Additionally, in various embodiments, the functionality described herein may be used in a headset that combines images of an environment external to near-eye display 120 and artificial reality content (e.g., computer-generated images). Therefore, near-eye display 120 may augment images of a physical, real-world environment external to near-eye display 120 with generated content (e.g., images, video, or sound) to present an augmented reality to a user.

In various embodiments, near-eye display 120 may include one or more of display electronics 122, display optics 124, and an eye-tracking unit 130. In some embodiments, near-eye display 120 may also include one or more locators 126, one or more position sensors 128, and an inertial measurement unit (IMU) 132. Near-eye display 120 may omit any of eye-tracking unit 130, locators 126, position sensors 128, and IMU 132, or include additional elements in various embodiments. Additionally, in some embodiments, near-eye display 120 may include elements combining the function of various elements described in conjunction with FIG. 1.

Display electronics 122 may display or facilitate the display of images to the user according to data received from, for example, console 110. In various embodiments, display electronics 122 may include one or more display panels, such as a liquid crystal display (LCD), an organic light emitting diode (OLED) display, an inorganic light emitting diode (ILED) display, a micro light emitting diode (uLED) display, an active-matrix OLED display (AMOLED), a transparent OLED display (TOLED), or some other display. For example, in one implementation of near-eye display 120, display electronics 122 may include a front TOLED panel, a rear display panel, and an optical component (e.g., an attenuator, polarizer, or diffractive or spectral film) between the front and rear display panels. Display electronics 122 may include pixels to emit light of a predominant color such as red, green, blue, white, or yellow. In some implementations, display electronics 122 may display a three-dimensional (3D) image through stereoscopic effects produced by two-dimensional panels to create a subjective perception of image depth. For example, display electronics 122 may include a left display and a right display positioned in front of a user's left eye and right eye, respectively. The left and right displays may present copies of an image shifted horizontally relative to each other to create a stereoscopic effect (i.e., a perception of image depth by a user viewing the image).

In certain embodiments, display optics 124 may display image content optically (e.g., using optical waveguides and couplers) or magnify image light received from display electronics 122, correct optical errors associated with the image light, and present the corrected image light to a user of near-eye display 120. In various embodiments, display optics 124 may include one or more optical elements, such as, for example, a substrate, optical waveguides, an aperture, a Fresnel lens, a convex lens, a concave lens, a filter, input/output couplers, or any other suitable optical elements that may affect image light emitted from display electronics 122. Display optics 124 may include a combination of different optical elements as well as mechanical couplings to maintain relative spacing and orientation of the optical elements in the combination. One or more optical elements in display optics 124 may have an optical coating, such as an antireflective coating, a reflective coating, a filtering coating, or a combination of different optical coatings.

Magnification of the image light by display optics 124 may allow display electronics 122 to be physically smaller, weigh less, and consume less power than larger displays. Additionally, magnification may increase a field of view of the displayed content. The amount of magnification of image light by display optics 124 may be changed by adjusting, adding, or removing optical elements from display optics 124. In some embodiments, display optics 124 may project displayed images to one or more image planes that may be further away from the user's eyes than near-eye display 120.

Display optics 124 may also be designed to correct one or more types of optical errors, such as two-dimensional optical errors, three-dimensional optical errors, or any combination thereof. Two-dimensional errors may include optical aberrations that occur in two dimensions. Example types of two-dimensional errors may include barrel distortion, pincushion distortion, longitudinal chromatic aberration, and transverse chromatic aberration. Three-dimensional errors may include optical errors that occur in three dimensions. Example types of three-dimensional errors may include spherical aberration, comatic aberration, field curvature, and astigmatism.

Locators 126 may be objects located in specific positions on near-eye display 120 relative to one another and relative to a reference point on near-eye display 120. In some implementations, console 110 may identify locators 126 in images captured by external imaging device 150 to determine the artificial reality headset's position, orientation, or both. A locator 126 may be an LED, a corner cube reflector, a reflective marker, a type of light source that contrasts with an environment in which near-eye display 120 operates, or any combination thereof. In embodiments where locators 126 are active components (e.g., LEDs or other types of light emitting devices), locators 126 may emit light in the visible band (e.g., about 380 nm to 750 nm), in the infrared (IR) band (e.g., about 750 nm to 1 mm), in the ultraviolet band (e.g., about 10 nm to about 380 nm), in another portion of the electromagnetic spectrum, or in any combination of portions of the electromagnetic spectrum.

External imaging device 150 may include one or more cameras, one or more video cameras, any other device capable of capturing images including one or more of locators 126, or any combination thereof. Additionally, external imaging device 150 may include one or more filters (e.g., to increase signal to noise ratio). External imaging device 150 may be configured to detect light emitted or reflected from locators 126 in a field of view of external imaging device 150. In embodiments where locators 126 include passive elements (e.g., retroreflectors), external imaging device 150 may include a light source that illuminates some or all of locators 126, which may retro-reflect the light to the light source in external imaging device 150. Slow calibration data may be communicated from external imaging device 150 to console 110, and external imaging device 150 may receive one or more calibration parameters from console 110 to adjust one or more imaging parameters (e.g., focal length, focus, frame rate, sensor temperature, shutter speed, or aperture).

Position sensors 128 may generate one or more measurement signals in response to motion of near-eye display 120. Examples of position sensors 128 may include accelerometers, gyroscopes, magnetometers, other motion-detecting or error-correcting sensors, or any combination thereof. For example, in some embodiments, position sensors 128 may include 11 multiple accelerometers to measure translational motion (e.g., forward/back, up/down, or left/right) and multiple gyroscopes to measure rotational motion (e.g., pitch, yaw, or roll). In some embodiments, various position sensors may be oriented orthogonally to each other.

IMU 132 may be an electronic device that generates fast calibration data based on measurement signals received from one or more of position sensors 128. Position sensors 128 may be located external to IMU 132, internal to IMU 132, or any combination thereof. Based on the one or more measurement signals from one or more position sensors 128, IMU 132 may generate fast calibration data indicating an estimated position of near-eye display 120 relative to an initial position of near-eye display 120. For example, IMU 132 may integrate measurement signals received from accelerometers over time to estimate a velocity vector and integrate the velocity vector over time to determine an estimated position of a reference point on near-eye display 120. Alternatively, IMU 132 may provide the sampled measurement signals to console 110, which may determine the fast calibration data. While the reference point may generally be defined as a point in space, in various embodiments, the reference point may also be defined as a point within near-eye display 120 (e.g., a center of IMU 132).

Eye-tracking unit 130 may include one or more eye-tracking systems. Eye tracking may refer to determining an eye's position, including orientation and location of the eye, relative to near-eye display 120. An eye-tracking system may include an imaging system to image one or more eyes and may optionally include a light emitter, which may generate light that is directed to an eye such that light reflected by the eye may be captured by the imaging system. For example, eye-tracking unit 130 may include a non-coherent or coherent light source (e.g., a laser diode) emitting light in the visible spectrum or infrared spectrum, and a camera capturing the light reflected by the user's eye. As another example, eye-tracking unit 130 may capture reflected radio waves emitted by a miniature radar unit. Eye-tracking unit 130 may use low-power light emitters that emit light at frequencies and intensities that would not injure the eye or cause physical discomfort. Eye-tracking unit 130 may be arranged to increase contrast in images of an eye captured by eye-tracking unit 130 while reducing the overall power consumed by eye-tracking unit 130 (e.g., reducing power consumed by a light emitter and an imaging system included in eye-tracking unit 130). For example, in some implementations, eye-tracking unit 130 may consume less than 100 milliwatts of power.

Near-eye display 120 may use the orientation of the eye to, e.g., determine an inter-pupillary distance (IPD) of the user, determine gaze direction, introduce depth cues (e.g., blur image outside of the user's main line of sight), collect heuristics on the user interaction in the VR media (e.g., time spent on any particular subject, object, or frame as a function of exposed stimuli), some other functions that are based in part on the orientation of at least one of the user's eyes, or any combination thereof. Because the orientation may be determined for both eyes of the user, eye-tracking unit 130 may be able to determine where the user is looking. For example, determining a direction of a user's gaze may include determining a point of convergence based on the determined orientations of the user's left and right eyes. A point of convergence may be the point where the two foveal axes of the user's eyes intersect. The direction of the user's gaze may be the direction of a line passing through the point of convergence and the mid-point between the pupils of the user's eyes.

Input/output interface 140 may be a device that allows a user to send action requests to console 110. An action request may be a request to perform a particular action. For example, an action request may be to start or to end an application or to perform a particular action within the application. Input/output interface 140 may include one or more input devices. Example input devices may include a keyboard, a mouse, a game controller, a glove, a button, a touch screen, or any other suitable device for receiving action requests and communicating the received action requests to console 110. An action request received by the input/output interface 140 may be communicated to console 110, which may perform an action corresponding to the requested action. In some embodiments, input/output interface 140 may provide haptic feedback to the user in accordance with instructions received from console 110. For example, input/output interface 140 may provide haptic feedback when an action request is received, or when console 110 has performed a requested action and communicates instructions to input/output interface 140. In some embodiments, external imaging device 150 may be used to track input/output interface 140, such as tracking the location or position of a controller (which may include, for example, an IR light source) or a hand of the user to determine the motion of the user. In some embodiments, near-eye display 120 may include one or more imaging devices to track input/output interface 140, such as tracking the location or position of a controller or a hand of the user to determine the motion of the user.

Console 110 may provide content to near-eye display 120 for presentation to the user in accordance with information received from one or more of external imaging device 150, near-eye display 120, and input/output interface 140. In the example shown in FIG. 1, console 110 may include an application store 112, a headset tracking module 114, an artificial reality engine 116, and an eye-tracking module 118. Some embodiments of console 110 may include different or additional modules than those described in conjunction with FIG. 1. Functions further described below may be distributed among components of console 110 in a different manner than is described here.

In some embodiments, console 110 may include a processor and a non-transitory computer-readable storage medium storing instructions executable by the processor. The processor may include multiple processing units executing instructions in parallel. The non-transitory computer-readable storage medium may be any memory, such as a hard disk drive, a removable memory, or a solid-state drive (e.g., flash memory or dynamic random access memory (DRAM)). In various embodiments, the modules of console 110 described in conjunction with FIG. 1 may be encoded as instructions in the non-transitory computer-readable storage medium that, when executed by the processor, cause the processor to perform the functions further described below.

Application store 112 may store one or more applications for execution by console 110. An application may include a group of instructions that, when executed by a processor, generates content for presentation to the user. Content generated by an application may be in response to inputs received from the user via movement of the user's eyes or inputs received from the input/output interface 140. Examples of the applications may include gaming applications, conferencing applications, video playback application, or other suitable applications.

Headset tracking module 114 may track movements of near-eye display 120 using slow calibration information from external imaging device 150. For example, headset tracking module 114 may determine positions of a reference point of near-eye display 120 using observed locators from the slow calibration information and a model of near-eye display 120. Headset tracking module 114 may also determine positions of a reference point of near-eye display 120 using position information from the fast calibration information. Additionally, in some embodiments, headset tracking module 114 may use portions of the fast calibration information, the slow calibration information, or any combination thereof, to predict a future location of near-eye display 120. Headset tracking module 114 may provide the estimated or predicted future position of near-eye display 120 to artificial reality engine 116.

Artificial reality engine 116 may execute applications within artificial reality system environment 100 and receive position information of near-eye display 120, acceleration information of near-eye display 120, velocity information of near-eye display 120, predicted future positions of near-eye display 120, or any combination thereof from headset tracking module 114. Artificial reality engine 116 may also receive estimated eye position and orientation information from eye-tracking module 118. Based on the received information, artificial reality engine 116 may determine content to provide to near-eye display 120 for presentation to the user. For example, if the received information indicates that the user has looked to the left, artificial reality engine 116 may generate content for near-eye display 120 that mirrors the user's eye movement in a virtual environment. Additionally, artificial reality engine 116 may perform an action within an application executing on console 110 in response to an action request received from input/output interface 140, and provide feedback to the user indicating that the action has been performed. The feedback may be visual or audible feedback via near-eye display 120 or haptic feedback via input/output interface 140.

Eye-tracking module 118 may receive eye-tracking data from eye-tracking unit 130 and determine the position of the user's eye based on the eye tracking data. The position of the eye may include an eye's orientation, location, or both relative to near-eye display 120 or any element thereof. Because the eye's axes of rotation change as a function of the eye's location in its socket, determining the eye's location in its socket may allow eye-tracking module 118 to determine the eye's orientation more accurately.

Figure 2:
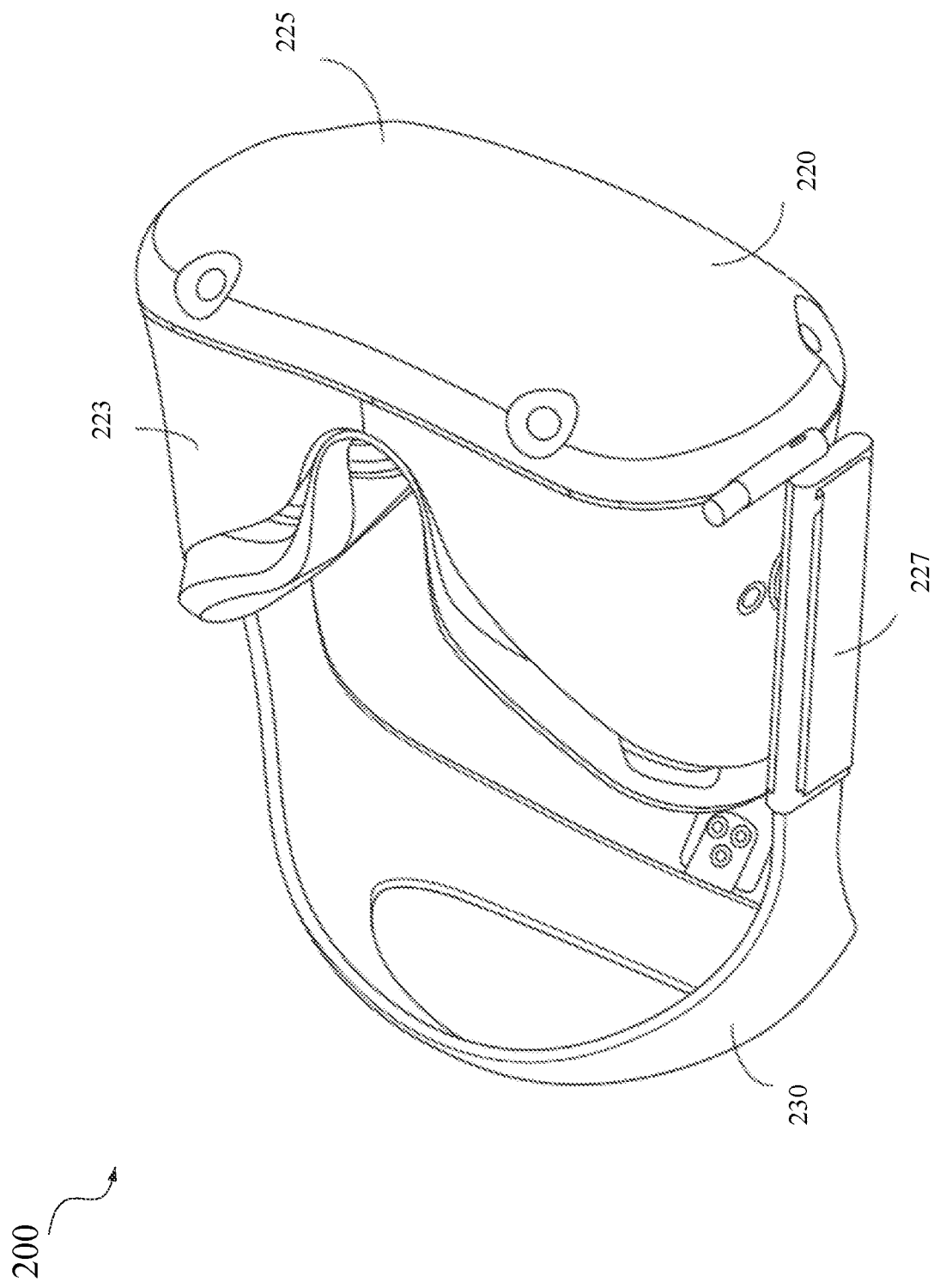
FIG. 2 is a perspective view of an example of a near-eye display in the form of a head-mounted display (HMD) device for implementing some of the examples disclosed herein.

FIG. 2 is a perspective view of an example of a near-eye display in the form of an HMD device 200 for implementing some of the examples disclosed herein. HMD device 200 may be a part of, e.g., a VR system, an AR system, an MR system, or any combination thereof. HMD device 200 may include a body 220 and a head strap 230. FIG. 2 shows a bottom side 223, a front side 225, and a left side 227 of body 220 in the perspective view. Head strap 230 may have an adjustable or extendible length. There may be a sufficient space between body 220 and head strap 230 of HMD device 200 for allowing a user to mount HMD device 200 onto the user's head. In various embodiments, HMD device 200 may include additional, fewer, or different components. For example, in some embodiments, HMD device 200 may include eyeglass temples and temple tips as shown in, for example, FIG. 3 below, rather than head strap 230.

HMD device 200 may present to a user media including virtual and/or augmented views of a physical, real-world environment with computer-generated elements. Examples of the media presented by HMD device 200 may include images (e.g., two-dimensional (2D) or three-dimensional (3D) images), videos (e.g., 2D or 3D videos), audio, or any combination thereof. The images and videos may be presented to each eye of the user by one or more display assemblies (not shown in FIG. 2) enclosed in body 220 of HMD device 200. In various embodiments, the one or more display assemblies may include a single electronic display panel or multiple electronic display panels (e.g., one display panel for each eye of the user). Examples of the electronic display panel(s) may include, for example, an LCD, an OLED display, an ILED display, a µLED display, an AMOLED, a TOLED, some other display, or any combination thereof. HMD device 200 may include two eyebox regions.

In some implementations, HMD device 200 may include various sensors (not shown), such as depth sensors, motion sensors, position sensors, and eye tracking sensors. Some of these sensors may use a structured light pattern for sensing. In some implementations, HMD device 200 may include an input/output interface for communicating with a console. In some implementations, HMD device 200 may include a virtual reality engine (not shown) that can execute applications within HMD device 200 and receive depth information, position information, acceleration information, velocity information, predicted future positions, or any combination thereof of HMD device 200 from the various sensors. In some implementations, the information received by the virtual reality engine may be used for producing a signal (e.g., display instructions) to the one or more display assemblies. In some implementations, HMD device 200 may include locators (not shown, such as locators 126) located in fixed positions on body 220 relative to one another and relative to a reference point. Each of the locators may emit light that is detectable by an external imaging device.

Figure 3:
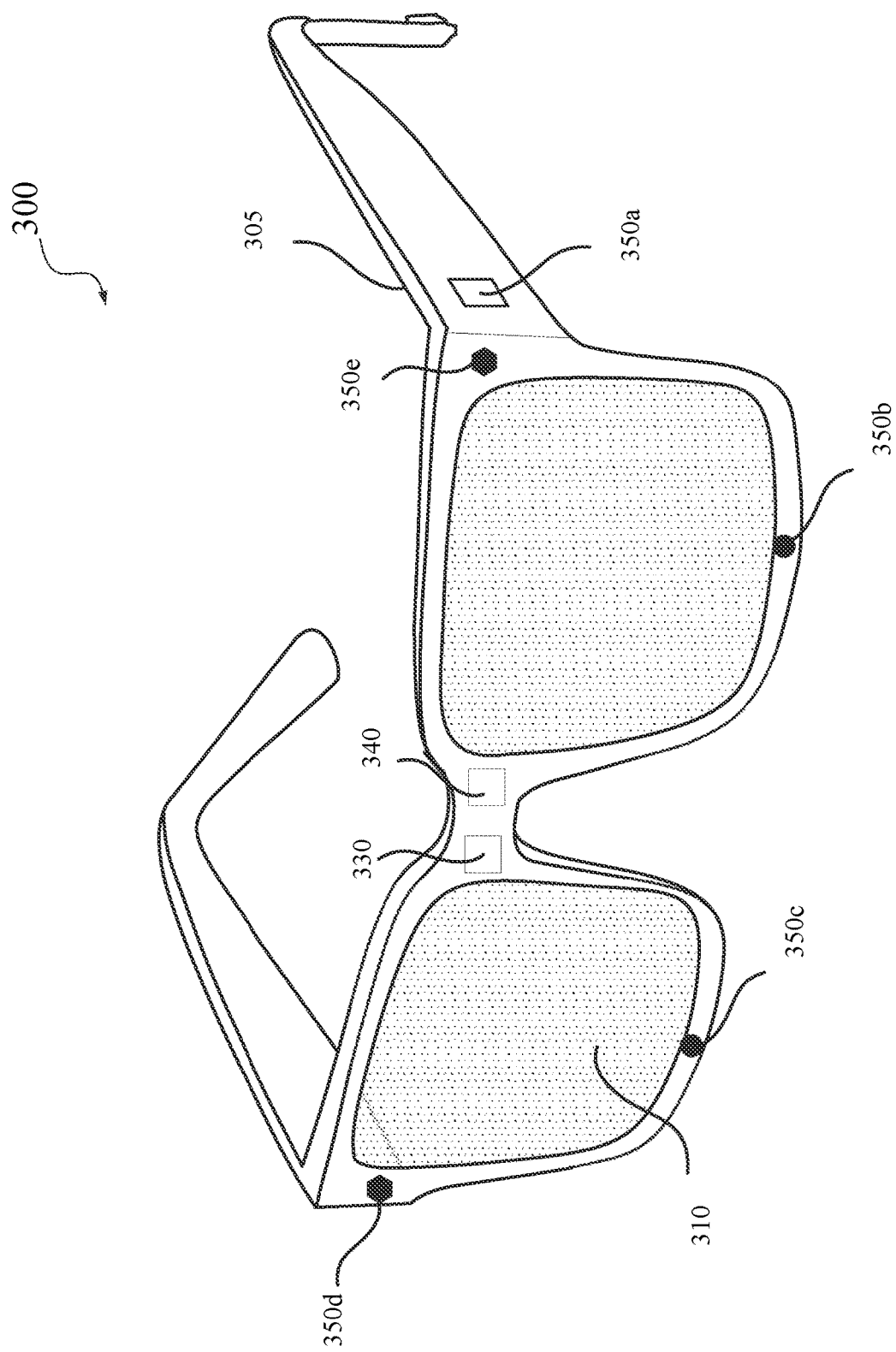
FIG. 3 is a perspective view of an example of a near-eye display in the form of a pair of glasses for implementing some of the examples disclosed herein.

FIG. 3 is a perspective view of an example of a near-eye display 300 in the form of a pair of glasses for implementing some of the examples disclosed herein. Near-eye display 300 may be a specific implementation of near-eye display 120 of FIG. 1, and may be configured to operate as a virtual reality display, an augmented reality display, and/or a mixed reality display. Near-eye display 300 may include a frame 305 and a display 310. Display 310 may be configured to present content to a user. In some embodiments, display 310 may include display electronics and/or display optics. For example, as described above with respect to near-eye display 120 of FIG. 1, display 310 may include an LCD display panel, an LED display panel, or an optical display panel (e.g., a waveguide display assembly).

Near-eye display 300 may further include various sensors 350a, 350b, 350c, 350d, and 350e on or within frame 305. In some embodiments, sensors 350a-350e may include one or more depth sensors, motion sensors, position sensors, inertial sensors, or ambient light sensors. In some embodiments, sensors 350a-350e may include one or more image sensors configured to generate image data representing different fields of views in different directions. In some embodiments, sensors 350a-350e may be used as input devices to control or influence the displayed content of near-eye display 300, and/or to provide an interactive VR/AR/MR experience to a user of near-eye display 300. In some embodiments, sensors 350a-350e may also be used for stereoscopic imaging.

In some embodiments, near-eye display 300 may further include one or more illuminators 330 to project light into the physical environment. The projected light may be associated with different frequency bands (e.g., visible light, infra-red light, or ultra-violet light), and may serve various purposes. For example, illuminator(s) 330 may project light in a dark environment (or in an environment with low intensity of infra-red light, ultra-violet light, etc.) to assist sensors 350a-350e in capturing images of different objects within the dark environment. In some embodiments, illuminator(s) 330 may be used to project certain light patterns onto the objects within the environment. In some embodiments, illuminator(s) 330 may be used as locators, such as locators 126 described above with respect to FIG. 1.

In some embodiments, near-eye display 300 may also include a high-resolution camera 340. Camera 340 may capture images of the physical environment in the field of view. The captured images may be processed, for example, by a virtual reality engine (e.g., artificial reality engine 116 of FIG. 1) to add virtual objects to the captured images or modify physical objects in the captured images, and the processed images may be displayed to the user by display 310 for AR or MR applications.

Figure 4:
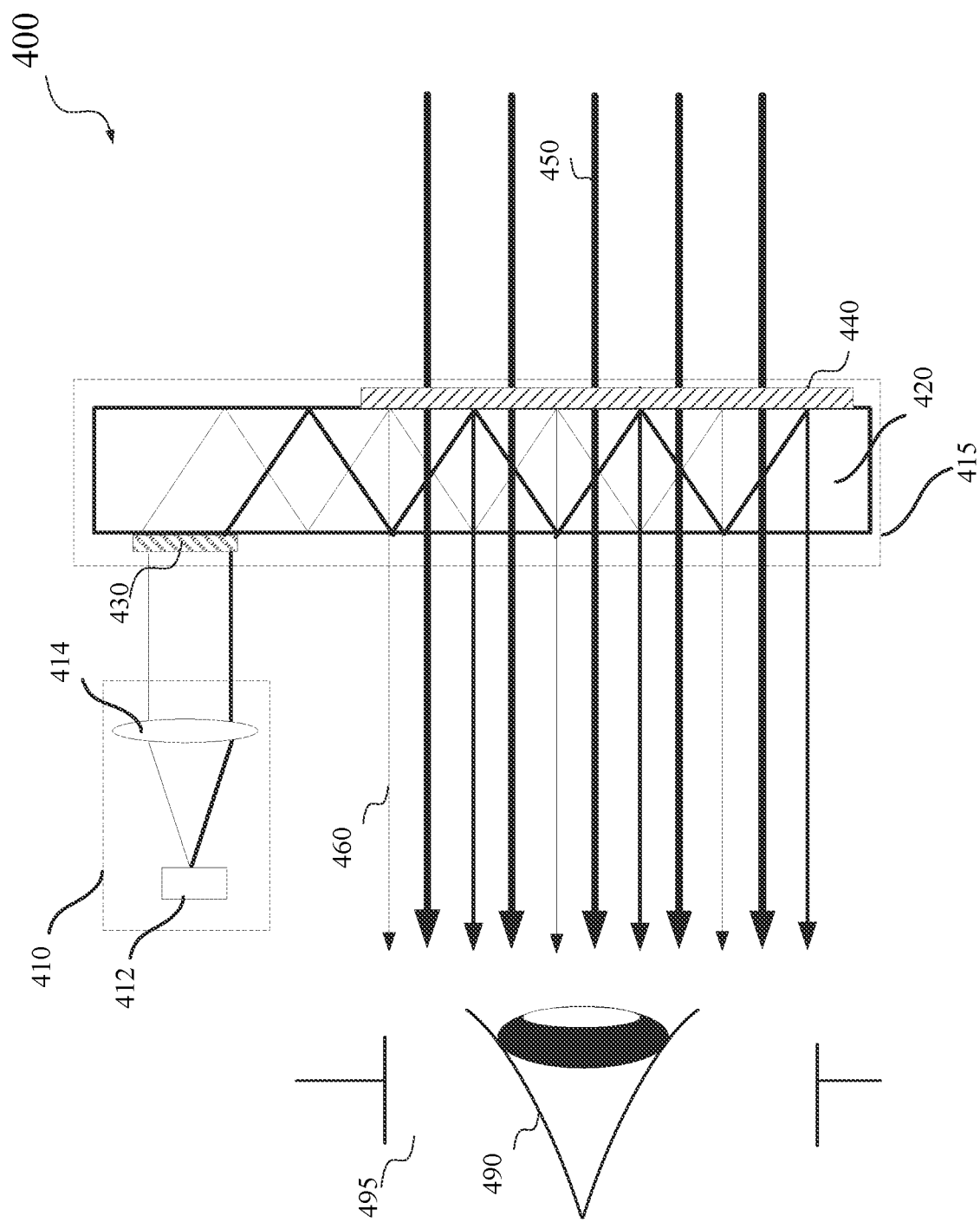
FIG. 4 illustrates an example of an optical see-through augmented reality system including a waveguide display according to certain embodiments.

FIG. 4 illustrates an example of an optical see-through augmented reality system 400 including a waveguide display according to certain embodiments. Augmented reality system 400 may include a projector 410 and a combiner 415. Projector 410 may include a light source or image source 412 and projector optics 414. In some embodiments, light source or image source 412 may include one or more micro-LED devices described above. In some embodiments, image source 412 may include a plurality of pixels that displays virtual objects, such as an LCD display panel or an LED display panel. In some embodiments, image source 412 may include a light source that generates coherent or partially coherent light. For example, image source 412 may include a laser diode, a vertical cavity surface emitting laser, an LED, and/or a micro-LED described above. In some embodiments, image source 412 may include a plurality of light sources (e.g., an array of micro-LEDs described above), each emitting a monochromatic image light corresponding to a primary color (e.g., red, green, or blue). In some embodiments, image source 412 may include three two-dimensional arrays of micro-LEDs, where each two-dimensional array of micro-LEDs may include micro-LEDs configured to emit light of a primary color (e.g., red, green, or blue). In some embodiments, image source 412 may include an optical pattern generator, such as a spatial light modulator. Projector optics 414 may include one or more optical components that can condition the light from image source 412, such as expanding, collimating, scanning, or projecting light from image source 412 to combiner 415. The one or more optical components may include, for example, one or more lenses, liquid lenses, mirrors, apertures, and/or gratings. For example, in some embodiments, image source 412 may include one or more one-dimensional arrays or elongated two-dimensional arrays of micro-LEDs, and projector optics 414 may include one or more one-dimensional scanners (e.g., micro-mirrors or prisms) configured to scan the one-dimensional arrays or elongated two-dimensional arrays of micro-LEDs to generate image frames. In some embodiments, projector optics 414 may include a liquid lens (e.g., a liquid crystal lens) with a plurality of electrodes that allows scanning of the light from image source 412.

Combiner 415 may include an input coupler 430 for coupling light from projector 410 into a substrate 420 of combiner 415. Combiner 415 may transmit at least 50% of light in a first wavelength range and reflect at least 25% of light in a second wavelength range. For example, the first wavelength range may be visible light from about 400 nm to about 650 nm, and the second wavelength range may be in the infrared band, for example, from about 800 nm to about 1000 nm. Input coupler 430 may include a volume holographic grating, a diffractive optical element (DOE) (e.g., a surface-relief grating), a slanted surface of substrate 420, or a refractive coupler (e.g., a wedge or a prism). For example, input coupler 430 may include a reflective volume Bragg grating or a transmissive volume Bragg grating. Input coupler 430 may have a coupling efficiency of greater than 30%, 50%, 75%, 90%, or higher for visible light. Light coupled into substrate 420 may propagate within substrate 420 through, for example, total internal reflection (TIR). Substrate 420 may be in the form of a lens of a pair of eyeglasses. Substrate 420 may have a flat or a curved surface, and may include one or more types of dielectric or semiconductor materials, such as glass, quartz, plastic, polymer, poly(methyl methacrylate) (PMMA), crystal, silicon, SiN, silicon carbide, ceramic, or the like. A thickness of the substrate may range from, for example, less than about 1 mm to about 10 mm or more. Substrate 420 may be transparent to visible light.

Substrate 420 may include or may be coupled to a plurality of output couplers 440, each configured to extract at least a portion of the light guided by and propagating within substrate 420 from substrate 420, and direct extracted light 460 to an eyebox 495 where an eye 490 of the user of augmented reality system 400 may be located when augmented reality system 400 is in use. The plurality of output couplers 440 may replicate the exit pupil to increase the size of eyebox 495 such that the displayed image is visible in a larger area. As input coupler 430, output couplers 440 may include grating couplers (e.g., volume holographic gratings or surface-relief gratings), other diffraction optical elements, or prisms. For example, output couplers 440 may include reflective volume Bragg gratings or transmissive volume Bragg gratings. Output couplers 440 may have different coupling (e.g., diffraction) efficiencies at different locations. Substrate 420 may also allow light 450 from the environment in front of combiner 415 to pass through with little or no loss. Output couplers 440 may also allow light 450 to pass through with little loss. For example, in some implementations, output couplers 440 may have a very low diffraction efficiency for light 450 such that light 450 may be refracted or otherwise pass through output couplers 440 with little loss, and thus may have a higher intensity than extracted light 460. In some implementations, output couplers 440 may have a high diffraction efficiency for light 450 and may diffract light 450 in certain desired directions (i.e., diffraction angles) with little loss. As a result, the user may be able to view combined images of the environment in front of combiner 415 and images of virtual objects projected by projector 410.

Figure 5B:
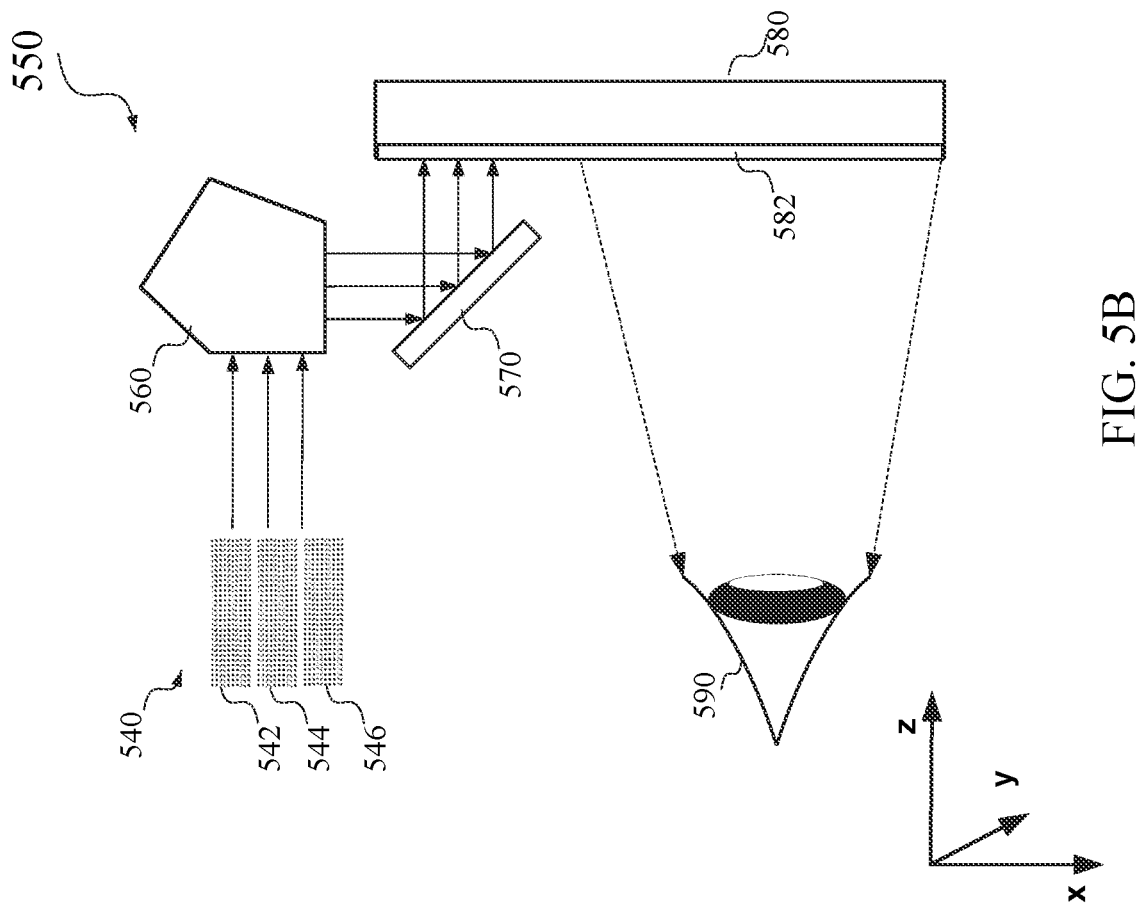
FIG. 5B illustrates another example of a near-eye display device including a waveguide display according to certain embodiments.
Figure 5A:
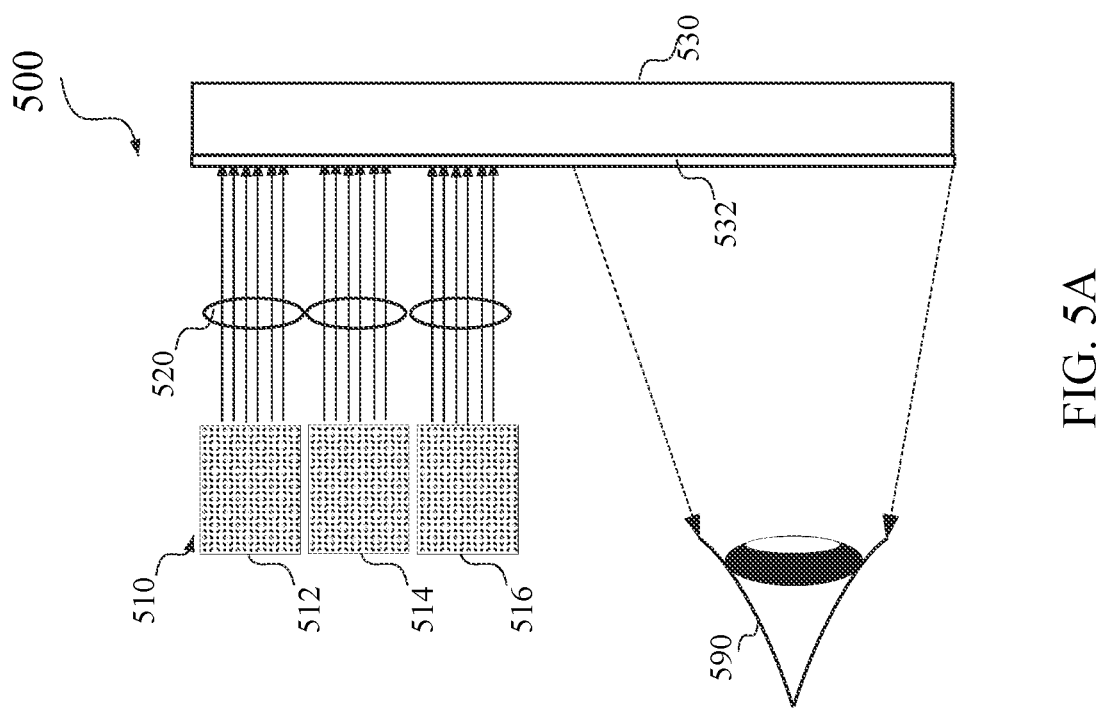
FIG. 5A illustrates an example of a near-eye display device including a waveguide display according to certain embodiments.

FIG. 5A illustrates an example of a near-eye display (NED) device 500 including a waveguide display 530 according to certain embodiments. NED device 500 may be an example of near-eye display 120, augmented reality system 400, or another type of display device. NED device 500 may include a light source 510, projection optics 520, and waveguide display 530. Light source 510 may include multiple panels of light emitters for different colors, such as a panel of red light emitters 512, a panel of green light emitters 514, and a panel of blue light emitters 516. The red light emitters 512 are organized into an array; the green light emitters 514 are organized into an array; and the blue light emitters 516 are organized into an array. The dimensions and pitches of light emitters in light source 510 may be small. For example, each light emitter may have a diameter less than 2 µm (e.g., about 1.2 µm) and the pitch may be less than 2 µm (e.g., about 1.5 µm). As such, the number of light emitters in each red light emitters 512, green light emitters 514, and blue light emitters 516 can be equal to or greater than the number of pixels in a display image, such as 960×720, 1280×720, 1440×1080, 1920×1080, 2160×1080, or 2560×1080 pixels. Thus, a display image may be generated simultaneously by light source 510. A scanning element may not be used in NED device 500.

Before reaching waveguide display 530, the light emitted by light source 510 may be conditioned by projection optics 520, which may include a lens array. Projection optics 520 may collimate or focus the light emitted by light source 510 to waveguide display 530, which may include a coupler 532 for coupling the light emitted by light source 510 into waveguide display 530. The light coupled into waveguide display 530 may propagate within waveguide display 530 through, for example, total internal reflection as described above with respect to FIG. 4. Coupler 532 may also couple portions of the light propagating within waveguide display 530 out of waveguide display 530 and towards user's eye 590.

FIG. 5B illustrates an example of a near-eye display (NED) device 550 including a waveguide display 580 according to certain embodiments. In some embodiments, NED device 550 may use a scanning mirror 570 to project light from a light source 540 to an image field where a user's eye 590 may be located. NED device 550 may be an example of near-eye display 120, augmented reality system 400, or another type of display device. Light source 540 may include one or more rows or one or more columns of light emitters of different colors, such as multiple rows of red light emitters 542, multiple rows of green light emitters 544, and multiple rows of blue light emitters 546. For example, red light emitters 542, green light emitters 544, and blue light emitters 546 may each include N rows, each row including, for example, 2560 light emitters (pixels). The red light emitters 542 are organized into an array; the green light emitters 544 are organized into an array; and the blue light emitters 546 are organized into an array. In some embodiments, light source 540 may include a single line of light emitters for each color. In some embodiments, light source 540 may include multiple columns of light emitters for each of red, green, and blue colors, where each column may include, for example, 1080 light emitters. In some embodiments, the dimensions and/or pitches of the light emitters in light source 540 may be relatively large (e.g., about 3-5 μm) and thus light source 540 may not include sufficient light emitters for simultaneously generating a full display image. For example, the number of light emitters for a single color may be fewer than the number of pixels (e.g., 2560×1080 pixels) in a display image. The light emitted by light source 540 may be a set of collimated or diverging beams of light.

Before reaching scanning mirror 570, the light emitted by light source 540 may be conditioned by various optical devices, such as collimating lenses or a freeform optical element 560. Freeform optical element 560 may include, for example, a multi-facet prism or another light folding element that may direct the light emitted by light source 540 towards scanning mirror 570, such as changing the propagation direction of the light emitted by light source 540 by, for example, about 90° or larger. In some embodiments, freeform optical element 560 may be rotatable to scan the light. Scanning mirror 570 and/or freeform optical element 560 may reflect and project the light emitted by light source 540 to waveguide display 580, which may include a coupler 582 for coupling the light emitted by light source 540 into waveguide display 580. The light coupled into waveguide display 580 may propagate within waveguide display 580 through, for example, total internal reflection as described above with respect to FIG. 4. Coupler 582 may also couple portions of the light propagating within waveguide display 580 out of waveguide display 580 and towards user's eye 590.

Scanning mirror 570 may include a microelectromechanical system (MEMS) mirror or any other suitable mirrors. Scanning mirror 570 may rotate to scan in one or two dimensions. As scanning mirror 570 rotates, the light emitted by light source 540 may be directed to a different area of waveguide display 580 such that a full display image may be projected onto waveguide display 580 and directed to user's eye 590 by waveguide display 580 in each scanning cycle. For example, in embodiments where light source 540 includes light emitters for all pixels in one or more rows or columns, scanning mirror 570 may be rotated in the column or row direction (e.g., x or y direction) to scan an image. In embodiments where light source 540 includes light emitters for some but not all pixels in one or more rows or columns, scanning mirror 570 may be rotated in both the row and column directions (e.g., both x and y directions) to project a display image (e.g., using a raster-type scanning pattern).

NED device 550 may operate in predefined display periods. A display period (e.g., display cycle) may refer to a duration of time in which a full image is scanned or projected. For example, a display period may be a reciprocal of the desired frame rate. In NED device 550 that includes scanning mirror 570, the display period may also be referred to as a scanning period or scanning cycle. The light generation by light source 540 may be synchronized with the rotation of scanning mirror 570. For example, each scanning cycle may include multiple scanning steps, where light source 540 may generate a different light pattern in each respective scanning step.

In each scanning cycle, as scanning mirror 570 rotates, a display image may be projected onto waveguide display 580 and user's eye 590. The actual color value and light intensity (e.g., brightness) of a given pixel location of the display image may be an average of the light beams of the three colors (e.g., red, green, and blue) illuminating the pixel location during the scanning period. After completing a scanning period, scanning mirror 570 may revert back to the initial position to project light for the first few rows of the next display image or may rotate in a reverse direction or scan pattern to project light for the next display image, where a new set of driving signals may be fed to light source 540. The same process may be repeated as scanning mirror 570 rotates in each scanning cycle. As such, different images may be projected to user's eye 590 in different scanning cycles.

Figure 6A:
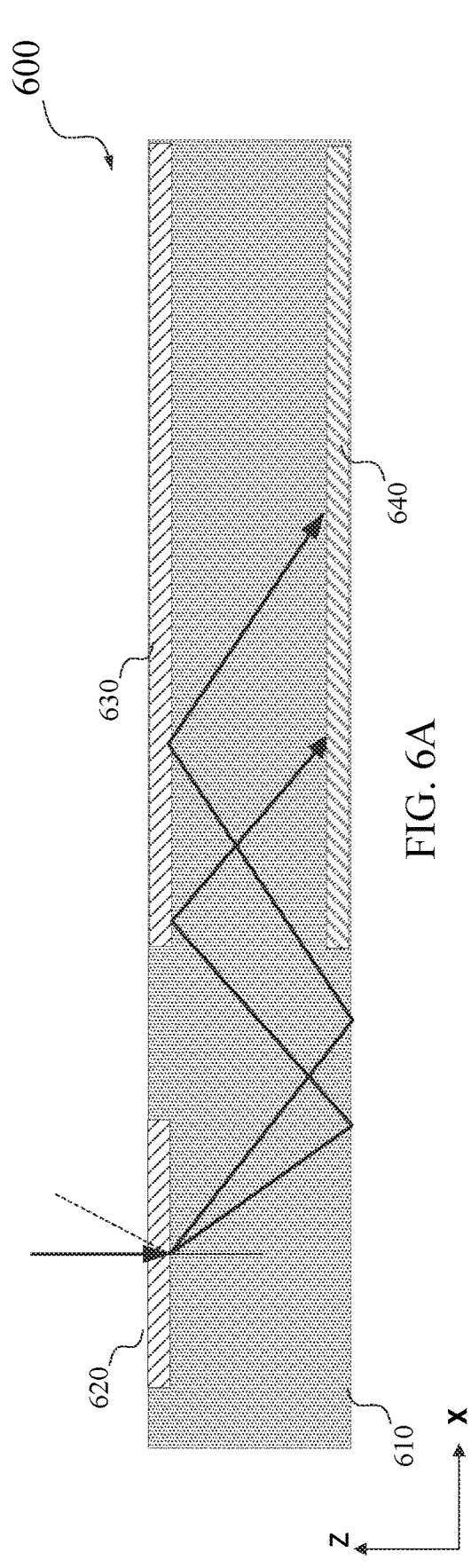
FIG. 6A illustrates an example of a waveguide display.

FIG. 6A illustrates an example of a waveguide display 600. Waveguide display 600 may include a substrate 610, which may be similar to substrate 420. Substrate 610 may include, for example, glass, silicon nitride, silicon carbide, LiNbO$_3$, TiO$_2$, SiC, CVD diamond, ZnS, or any other suitable material. An input grating 620 and one or more output gratings 630 and 640 may be etched in substrate 610 or may be etched or imprinted in a grating material layer formed on substrate 610. In some embodiments, input gratings 620 and output gratings 630 and 640 may be holographic gratings recorded in holographic material layers coated on substrate 610. In some embodiments, input grating 620 and output gratings 630 and 640 may include slanted or vertical surface-relief gratings etched in substrate 610 or imprinted in nanoimprint material layers deposited on substrate 610, and may include an overcoat layer filling the grating grooves. Output gratings 630 and 640 may be etched on opposite surfaces of substrate 610. In some embodiments, only one output grating 630 or 640 may be used. Input grating 620 may couple display light of different colors (e.g., red, green, and blue) from different view angles (or within different fields of view (FOVs)) into substrate 610, which may guide the in-coupled display light through total internal reflection. A portion of the in-coupled display light propagating within substrate 610 may be coupled out of substrate 610 towards an eyebox of waveguide display 600 by output grating 630 or 640 each time the in-coupled display light reaches output grating 630 or 640.

To satisfy the grating equation, a diffraction grating may diffract incident light of different colors (wavelengths) and/or from different view angles to different diffraction angles. For example, in the example illustrated in FIG. 6A, two light beams having different colors (e.g., red and blue) and the same incidence angle (e.g., about 0°) may be diffracted by input grating 620 to different directions within substrate 610. Two light beams having the same color but different incidence angles may also be diffracted by input grating 620 to two different directions within substrate 610. Due to the different propagation directions, the two in-coupled light beams may reach the surfaces of substrate 610 and be diffracted out of substrate 610 after propagating different distances in the x direction. A light beam having a smaller angle with respect to the surface-normal direction of substrate 610 may reach output grating 630 or 640 for a larger number of times than a light beam having a larger angle with respect to the surface-normal direction of substrate 610. In addition, a grating may not have a uniformed diffraction efficiency for incident light of different colors or different incidence angles. For at least these reasons, display light of different colors or from different FOVs may be directed to the eyebox at different densities, and may also form ghost images on the retina of user's eyes.

According to certain embodiments, to reduce the ghost images and other artifacts and improve the uniformity of the display for light of all colors and from all FOVs, a multi-layer waveguide may be used. The multi-layer waveguide may include multiple waveguide layers having appropriate refractive indices and thicknesses in a layer stack. In some embodiments, the multiple waveguide layers in the layer stack may have the highest refractive index at the center of the layer stack, and the refractive indices of the multiple waveguide layers may decrease from the center towards the two opposite sides of the layer stack. In some embodiments, the refractive indices of the multiple waveguide layers may decrease from one side toward the opposite side of the layer stack.

Figure 6B:
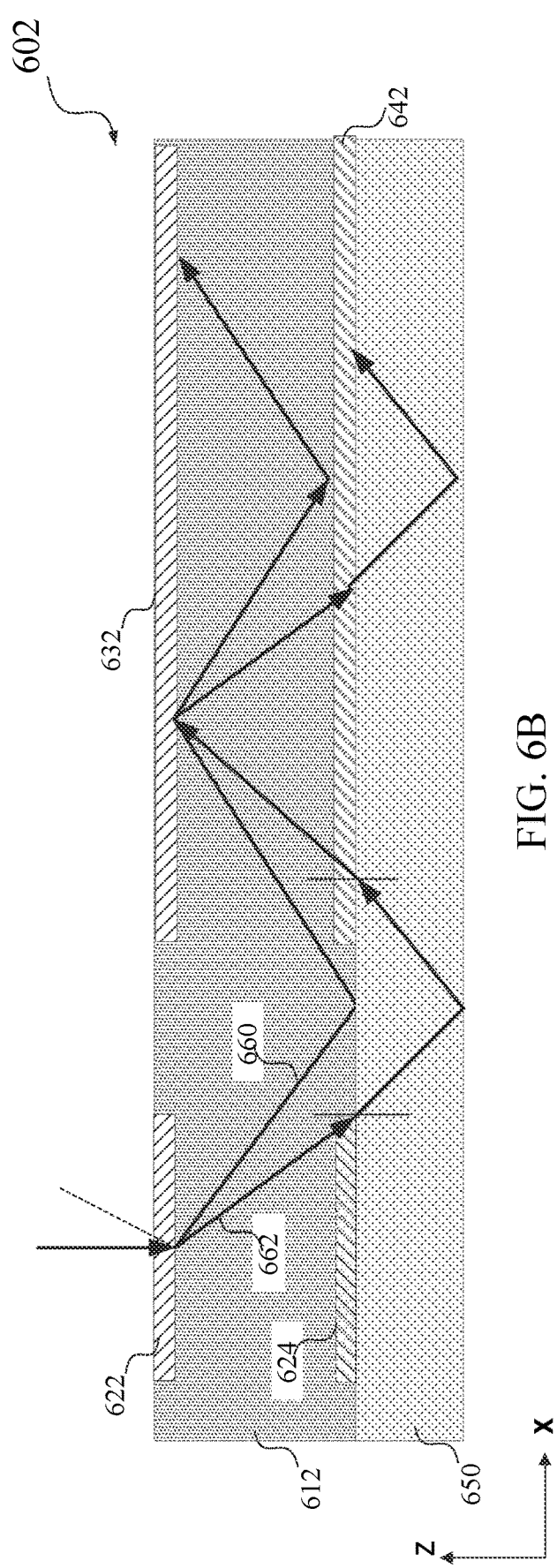
FIG. 6B illustrates an example of a multi-layer waveguide display according to certain embodiments.

FIG. 6B illustrates an example of a multi-layer waveguide display 602 according to certain embodiments. Multi-layer waveguide display 602 may include a substrate 612, an input grating 622, and one or more output gratings 632 and 642, which may be similar to substrate 610, input grating 620, and one or more output gratings 630 and 640, respectively. Input gratings 622 and 624 and output gratings 632 and 642 may be vertical or slanted surface-relief gratings formed in substrate 612 or a grating material layer on substrate 612, and may include an overcoat layer filling the grating grooves as described above. Multi-layer waveguide display 602 may also include a second waveguide layer 650, which may be a thin layer (e.g., a few hundred micrometers, such as between about 100 μm and about 600 μm) of a transparent material having a lower refractive index than the refractive index of substrate 612. For example, the difference between the refractive index of substrate 612 and the refractive index of second waveguide layer 650 may be between about 0.01 and about 0.3, or larger.

In the example shown in FIG. 6B, a first light beam 660 (e.g., having a longer wavelength or from a larger view angle) may be coupled into substrate 612 by input grating 622 and may propagate within substrate 612 with a large angle with respect to a surface-normal direction of substrate 612. Therefore, first light beam 660 may be reflected at the interface between substrate 612 and second waveguide layer 650 through total internal reflection, due to the large incidence angle and the large difference between the refractive indices of substrate 612 and second waveguide layer 650. A second light beam 662 (e.g., having a shorter wavelength and/or from a smaller view angle) may be coupled into substrate 612 by input grating 622 and may propagate within substrate 612 with a smaller angle with respect to the surface-normal direction of substrate 612. Therefore, second light beam 662 may not be reflected at the interface between substrate 612 and second waveguide layer 650 through total internal reflection, because the incidence angle may be smaller than the critical angle at the interface. Thus, second light beam 662 may instead be refracted at the interface with a larger refraction angle into second waveguide layer 650, and may then be reflected at the bottom surface of second waveguide layer 650 through total internal reflection due to the increased incidence angle and the larger difference (e.g., about 0.5) between the refractive indices of second waveguide layer 650 and air. Therefore, even though second light beam 662 may have a smaller propagation angle with respect to the surface-normal direction of substrate 612 than first light beam 660, second light beam 662 may travel a longer distance in the z direction before being reflected through total internal reflection, and thus may travel a similar distance in the x direction as first light beam 660 before being reflected through total internal reflection. In this way, first light beam 660 and second light beam 662 may be diffracted by output grating 632 or 642 at about the same locations (or same interval) and for about the same number of times. The thicknesses and refractive indices of substrate 612 and second waveguide layer 650 may be selected based on the desired performance.

Figure 7A:
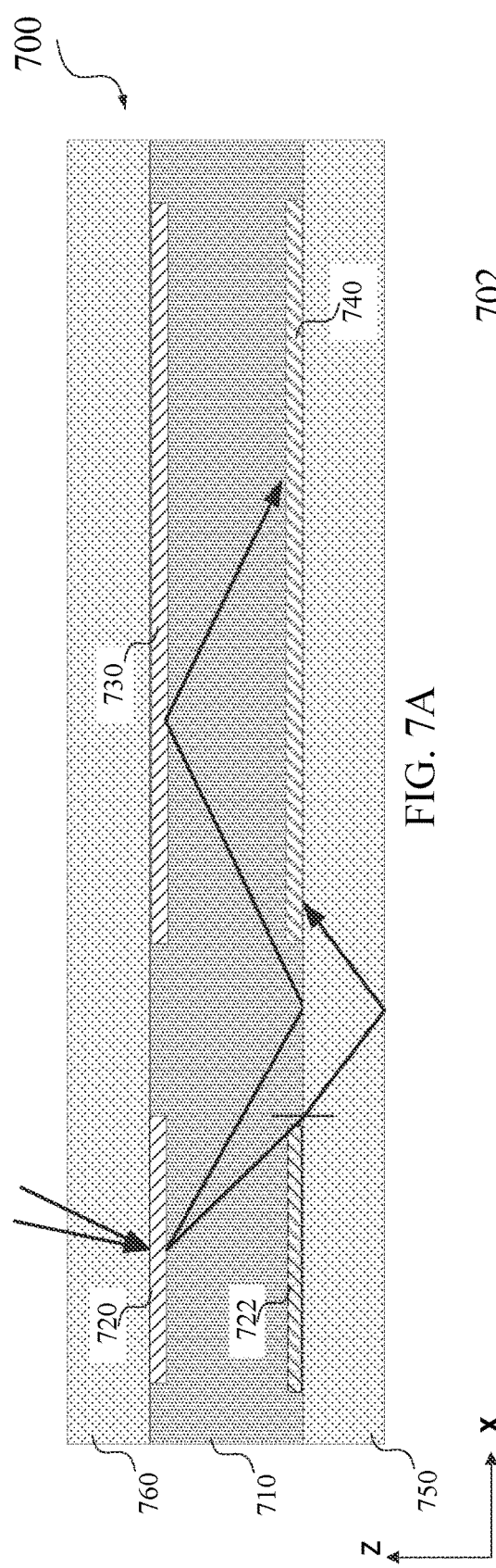
FIG. 7A illustrates an example of a multi-layer waveguide display according to certain embodiments.

FIG. 7A illustrates an example of a multi-layer waveguide display 700 according to certain embodiments. Multi-layer waveguide display 700 may include a first waveguide layer 710 that includes one or more input gratings 720 and 722 and one or more output gratings 730 and 740 formed thereon as in waveguide display 600 and multi-layer waveguide display 602 described above. First waveguide layer 710 may include, for example, glass, silicon nitride, silicon carbide, LiNbO$_3$, TiO$_2$, CVD diamond, ZnS, and the like. Input gratings 720 and 722 and output gratings 730 and 740 may be slanted or vertical holographic or surface-relief gratings and may include an overcoat layer filling the grating grooves. In some embodiments, one or more of input gratings 720 and 722 and output gratings 730 and 740 may each have a variable grating period, a variable duty cycle, a variable slant angle, and/or a variable etch depth. In some embodiments, one or more of the input gratings and output gratings may each include a two-dimensional grating that has a variable grating period, a variable duty cycle, a variable slant angle, and/or a variable etch depth along two directions of the two-dimensional grating.

Multi-layer waveguide display 700 may include a second waveguide layer 750 and a third waveguide layer 760 on opposing sides of first waveguide layer 710. Second waveguide layer 750 and third waveguide layer 760 may each be a thin layer (e.g., a few hundred micrometers, such as between about 100 μm and about 600 μm) of a transparent material having a lower refractive index than the refractive index of first waveguide layer 710. For example, the difference between the refractive index of first waveguide layer 710 and the refractive index of second waveguide layer 750 or third waveguide layer 760 may be between about 0.01 and about 0.3, or larger. Multi-layer waveguide display 700 may achieve a more uniform replication of display light having different colors and/or from different FOVs as described above with respect to FIG. 6B. The thicknesses and the refractive indices of first waveguide layer 710, second waveguide layer 750, and third waveguide layer 760 may be selected based on the desired performance.

Figure 7B:
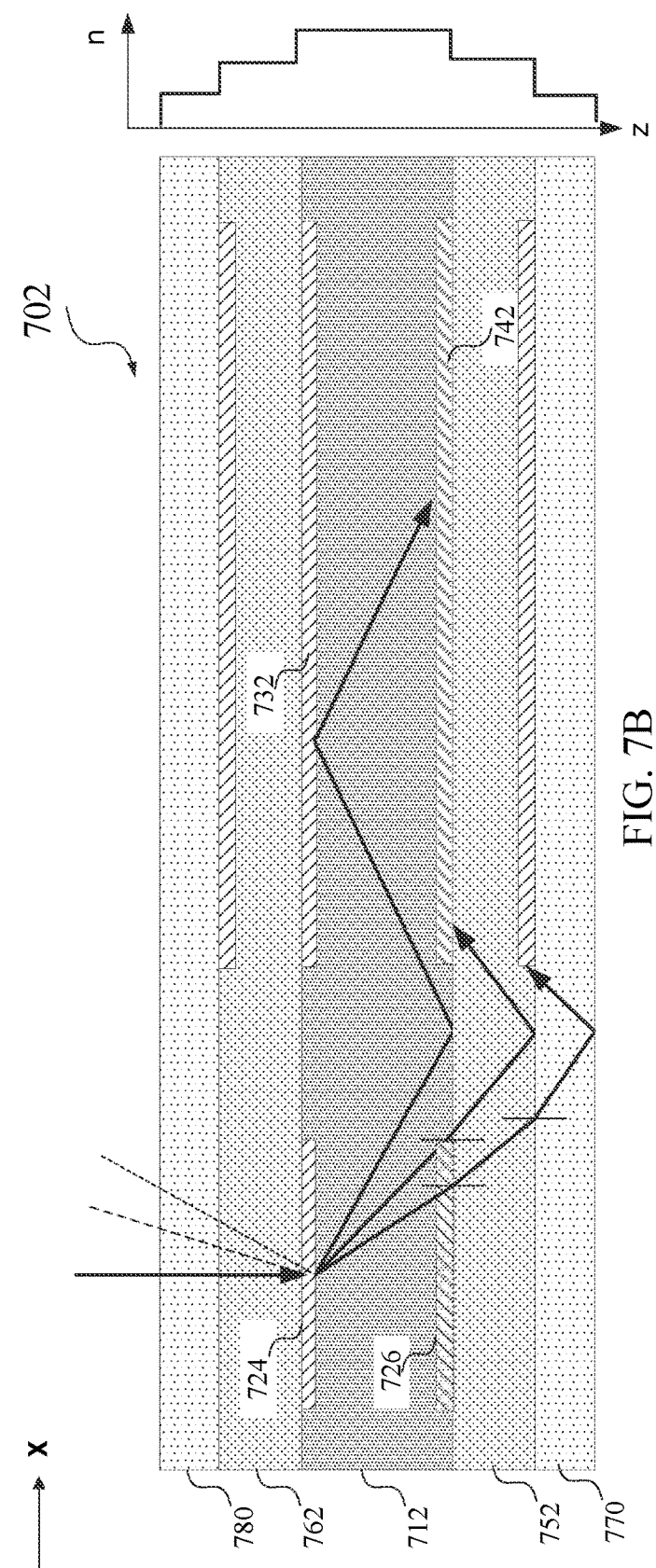
FIG. 7B illustrates another example of a multi-layer waveguide display according to certain embodiments.

FIG. 7B illustrates another example of a multi-layer waveguide display 702 according to certain embodiments. Multi-layer waveguide display 702 may include a first waveguide layer 712 that includes one or more input gratings 724 and 726 and one or two output gratings 732 and 742 formed thereon as in waveguide display 600 and multi-layer waveguide display 602 or 700 described above. First waveguide layer 712 may include, for example, glass, silicon nitride, silicon carbide, LiNbO$_3$, TiO$_2$, CVD diamond, ZnS, and the like. Input gratings 724 and 726 and output gratings 732 and 742 may be slanted or vertical holographic or surface-relief gratings and may include an overcoat layer filling the grating grooves. In some embodiments, one or more of input gratings 724 and 726 and output gratings 732 and 742 may each have a variable grating period, a variable duty cycle, a variable slant angle, and/or a variable etch depth. In some embodiments, one or more of the input gratings and output gratings may each include a two-dimensional grating that has a variable grating period, a variable duty cycle, a variable slant angle, and/or a variable etch depth along two directions of the two-dimensional grating.

Multi-layer waveguide display 702 may include a second waveguide layer 752 and a third waveguide layer 762 on opposing sides of first waveguide layer 712. Second waveguide layer 752 and third waveguide layer 762 may each be a thin layer (e.g., a few hundred micrometers, such as between about 100 µm and about 600 µm) of a transparent material having a lower refractive index than the refractive index of first waveguide layer 712. For example, the difference between the refractive index of first waveguide layer 712 and the refractive index of second waveguide layer 752 or third waveguide layer 762 may be between about 0.01 and about 0.3, or larger. Second waveguide layer 752 and third waveguide layer 762 may have a same refractive index or different refractive indices.

In addition, a fourth waveguide layer 770 may be formed on second waveguide layer 752, and a fifth waveguide layer 780 may be formed on third waveguide layer 762. Fourth waveguide layer 770 and fifth waveguide layer 780 may each be a thin layer (e.g., a few hundred micrometers, such as between about 100 µm and about 600 µm) of a transparent material having a lower refractive index than the refractive indices of second waveguide layer 752 and third waveguide layer 762, respectively. For example, the difference between the refractive index of second waveguide layer 752 and the refractive index of fourth waveguide layer 770 and the difference between the refractive index of third waveguide layer 762 and the refractive index of fifth waveguide layer 780 may be between about 0.01 and about 0.3, or larger. Fourth waveguide layer 770 and fifth waveguide layer 780 may have a same refractive index or different refractive indices. Multi-layer waveguide display 702 may achieve a more uniform replication of light having different colors and from different FOVs as described above with respect to FIG. 6B. The thicknesses and the refractive indices of first waveguide layer 712, second waveguide layer 752, third waveguide layer 762, fourth waveguide layer 770, and fifth waveguide layer 780 may be selected based on the desired performance.

In various embodiments, the multi-layer waveguide displays disclosed herein may include two or more waveguide layers, such as three, four, five, or more layers. In some embodiments, the low-index waveguide layers may be on a same side of the input and output gratings, and the refractive indices of the two or more waveguide layers may be the highest at one side of the layer stack and then gradually decrease towards the other side of the layer stack. For example, multi-layer waveguide display 700 may not include either second waveguide layer 750 or third waveguide layer 760, while multi-layer waveguide display 702 may not include either waveguide layers 762 and 780 or waveguide layers 752 and 770. In some embodiments, the low-index waveguide layers may be on opposing sides of the input and output gratings, and the refractive indices of the two or more waveguide layers may be the highest at the center of the layer stack and may gradually decrease towards two opposite sides of the layer stack. In some embodiments, the refractive index profile of the waveguide layer stack may be symmetrical and have the highest value at the center as shown in FIG. 7B. In some embodiments, the refractive index profile of the waveguide layer stack may not be symmetrical with respect to the center of the waveguide layer stack. In some embodiments, one or more gratings or other optical elements may be formed in or on waveguide layer 752, 762, 770, or 780.

To achieve a better optical performance, the multiple waveguide layers having different refractive indices and thicknesses (e.g., from about 100 µm to about 600 µm) may need to be flat, for example, having a low TTV (e.g., <1 µm) or wedge angle (e.g., <1 arcsec), and a low surface roughness (e.g., with an optical roughness less than about 10 nm, less than about 5 nm, or less than about 1 nm). It can be challenging to fabricate the multiple waveguide layers using existing techniques (e.g., using grinding techniques described above for correcting the substrates used as waveguide layers).

Figure 8B:
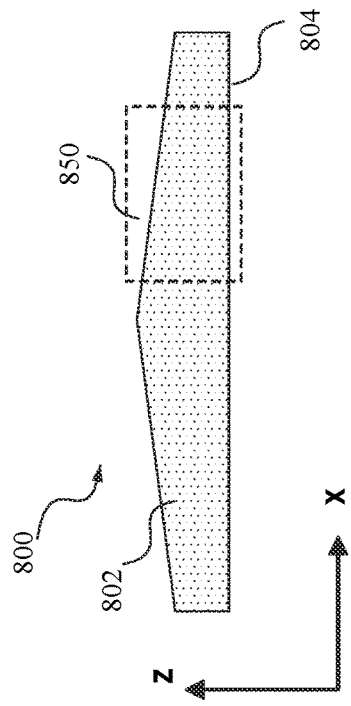
FIG. 8B is a cross-sectional view of the example of the substrate for fabricating waveguide display devices.
Figure 8A:
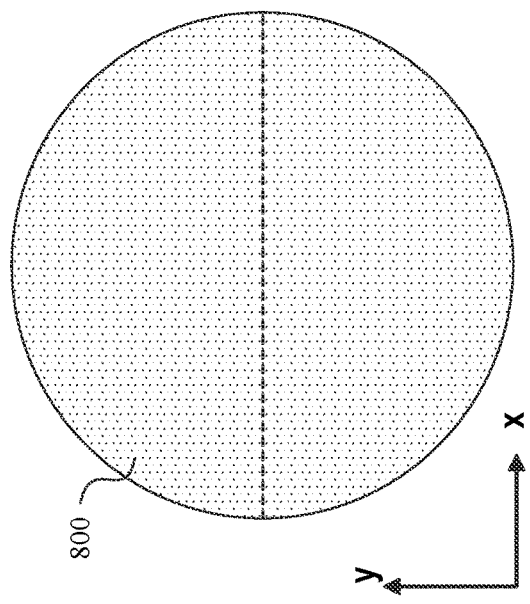
FIG. 8A is a top view of an example of a substrate for fabricating waveguide display devices.

FIG. 8A shows a top view of an example of a substrate 800 for fabricating waveguide display devices. FIG. 8B illustrates a cross-sectional view of the example of substrate 800 for fabricating waveguide display devices. In the illustrated example, substrate 800 may be in a circular shape viewing from the top and may be used to fabricate a waveguide layer 850. Specifically, as illustrated in FIG. 8B, substrate 800 may or may not have been corrected (e.g., using correction techniques such as techniques based on grinding and the associated post-treatments described above for reducing TTV), and thus may have a large TTV or a large wedge angle as shown by the uneven top surface 802. A waveguide layer 850 can be fabricated (e.g., being diced out) from a target area of substrate 800. Waveguide layer 850 can be used, together with other waveguide layers, to form a layer stack, such as multi-layer waveguide displays 602, 700, and 702 shown in FIGS. 6B-7B.

Because existing correction techniques such as wafer-level grinding may still result in a high local TTV (e.g., larger than 1 µm) and/or a large local wedge angle (e.g., larger than 1 arcsec) after the correction, the multi-layer waveguide display device formed using waveguide layers having high TTVs may have poor optical performance, such as chief ray angle shift, modulation transfer function degradation, lateral color aberration, pupil swim, text breaks, and/or double images.

Figure 8C:
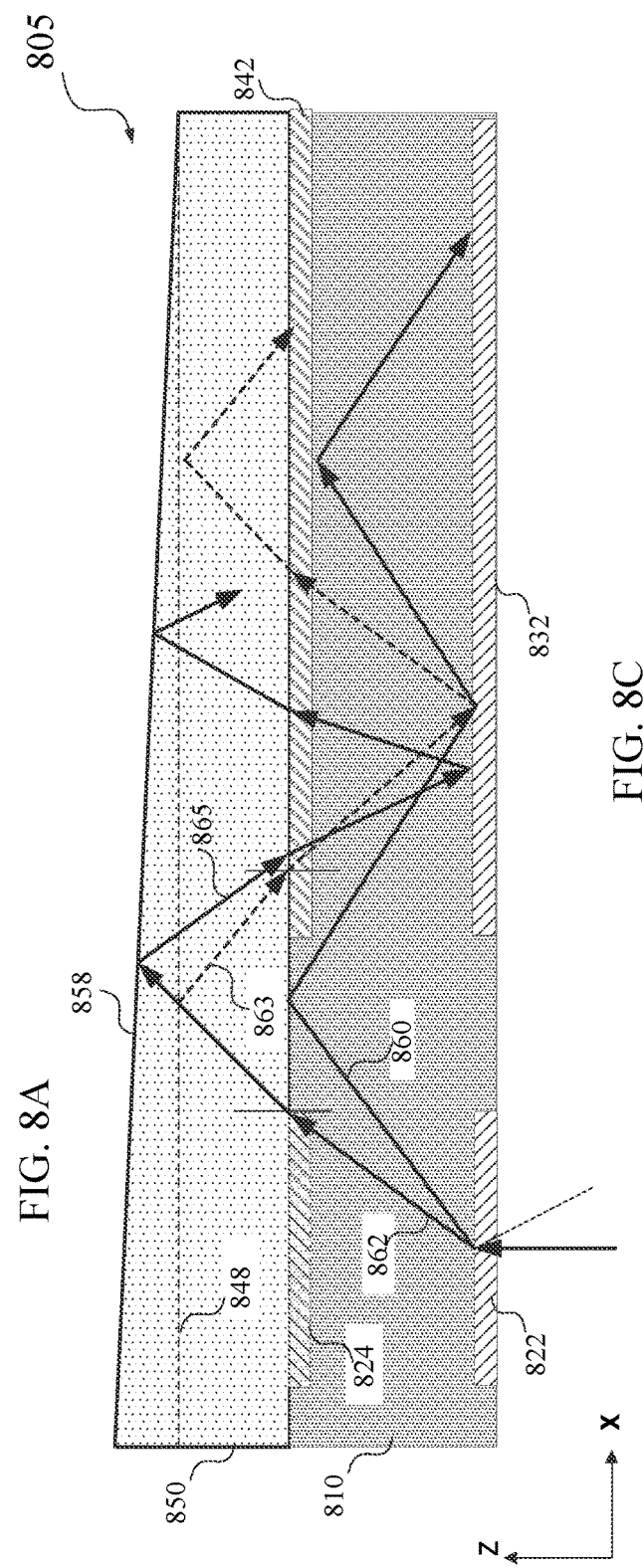
FIG. 8C illustrates an example of a waveguide display including a waveguide layer having a wedge shape.

FIG. 8C illustrates an example of a waveguide display 805 including waveguide layer 850 having a wedge shape. Waveguide display 805 may be similar to multi-layer waveguide display 602 shown in FIG. 6B. In the illustrated example, waveguide layer 850 may be bonded or laminated to a waveguide layer 810 that includes one or more input gratings 822 and 824, and one or more output gratings 832 and 842 to form waveguide display 805.

In the example shown in FIG. 8C, a first light beam 860 (e.g., having a longer wavelength or from a larger view angle) may be coupled into waveguide layer 810 by input grating 822 at a large angle with respect to a surface-normal direction of waveguide layer 810. Therefore, first light beam 860 may be reflected at the interface between waveguide layer 810 and waveguide layer 850 through total internal reflection, due to the large incidence angle and the difference between the refractive indices of waveguide layer 810 and waveguide layer 850. A second light beam 862 (e.g., having a shorter wavelength and/or from a smaller view angle) may be coupled into waveguide layer 810 by input grating 822 and may propagate within waveguide layer 810 at a smaller angle with respect to the surface-normal direction of waveguide layer 810. Therefore, second light beam 862 may not be reflected at the interface between waveguide layer 810 and waveguide layer 850 through total internal reflection, because the incidence angle may be smaller than the critical angle at the interface. Thus, second light beam 862 may instead be refracted at the interface with a larger refraction angle into waveguide layer 850, and may then be reflected at the top surface of waveguide layer 850 through total internal reflection due to the increased incidence angle and the larger difference (e.g., about 0.5) between the refractive indices of waveguide layer 850 and air. Under ideal condition where waveguide layer 850 may have a low (e.g., close to zero) TTV or wedge angle (e.g., having an ideal flat top surface as shown by a plane 848), and thus second light beam 862 may be reflected at plane 848. Even though second light beam 862 may have a smaller propagation angle with respect to the surface-normal direction of waveguide layer 810 than first light beam 860, second light beam 862 may travel a longer distance in the z direction before being reflected through total internal reflection, and thus may travel a similar distance in the x direction as first light beam 860 before being reflected through total internal reflection (e.g., as shown by a light ray 863). In this way, first light beam 860 and second light beam 862 may be diffracted by output grating 832 or 842 at about the same locations (or about the same interval) and for about the same number of times. The thicknesses and refractive indices of waveguide layer 810 and waveguide layer 850 may be selected based on the desired performance.

However, with no precise TTV control, waveguide layer 850 may have a wedge shape (e.g., having a TTV higher than 1 μm and/or a wedge angle larger than 1 arcsec). Because of the wedge shape, the incident angle of second light beam 862 (after being refracted into waveguide layer 850) incident on a top surface 858 of waveguide layer 850 and the incident angle of the guided light beam incident on the bottom surface of waveguide layer 810 may gradually change (e.g., gradually decrease in the illustrated example). For example, due to the unevenness of waveguide layer 850, second light beam 862 may instead be reflected by top surface 858 of waveguide layer 850 to a direction as shown by a light ray 865. As such, first light beam 860 and second light beam 862 may be coupled out of waveguide display 805 (e.g., diffracted by output grating 832 or 842) at different locations. In addition, the distance between two adjacent reflection locations at top surface 858 may gradually decrease. As such, the exit pupil may not be evenly replicated.

In addition, since the incident angles of the light beam incident on different locations of output gratings 832 and 842 may be different, the diffraction angles of the light beam diffracted at different locations of output gratings 832 and 842 may also be different. As such, display light from a same FOV angle may be diffracted at different locations of the output gratings towards different directions. As a results, optical artifacts such as double images may occur and the quality of the displayed images may be poor. In some cases, since the incident angle of second light beam 862 incident on top surface 858 and the incident angle of second light beam 862 incident on the bottom surface of waveguide layer 810 may gradually decrease as second light beam 862 propagates in waveguide display 805, at some locations, the incident angle of second light beam 862 incident on top surface 858 or the incident angle of second light beam 862 incident on the bottom surface of waveguide layer 810 may be smaller than the critical angle, and thus may no longer be guided in waveguide display 805 through total internal reflection.

Figure 9A:
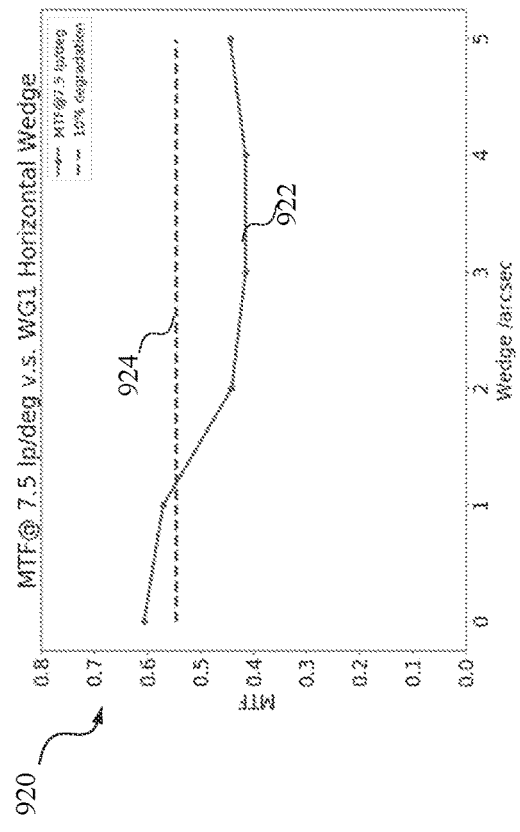
FIGS. 9A-9D illustrate examples of performance degradation of waveguide displays including wedge-shaped waveguide layers.

FIGS. 9A-9D illustrate examples of performance degradation of waveguide displays including wedge-shaped waveguide layers. FIG. 9A includes a graph 910 illustrating the chief ray angle shift (also referred to as boresight error) of a waveguide display as a function of the wedge angle of the waveguide of the waveguide display. The waveguide may include one or more waveguide layers, and the wedge angle may be the overall wedge angle of the waveguide. Due to the wedge shape of the waveguide, the chief ray angle of a light beam guided by and coupled out of the waveguide may deviate from the ideal chief ray angle, which may cause image shift and/or distortion. In FIG. 9A, a curve 912 shows the chief ray angle shift (in arcmin) for light beams with on-axis chief ray, a curve 914 shows the worst-case chief ray angle shift for light beams of the waveguide display, and a line 916 shows the maximum tolerable boresight error of the waveguide display. FIG. 9A shows that, when the wedge angle is great than about 2 arcsecs, the boresight error may be higher than the maximum tolerable boresight error, and thus the image shift and distortion may be large.

Figure 9B:
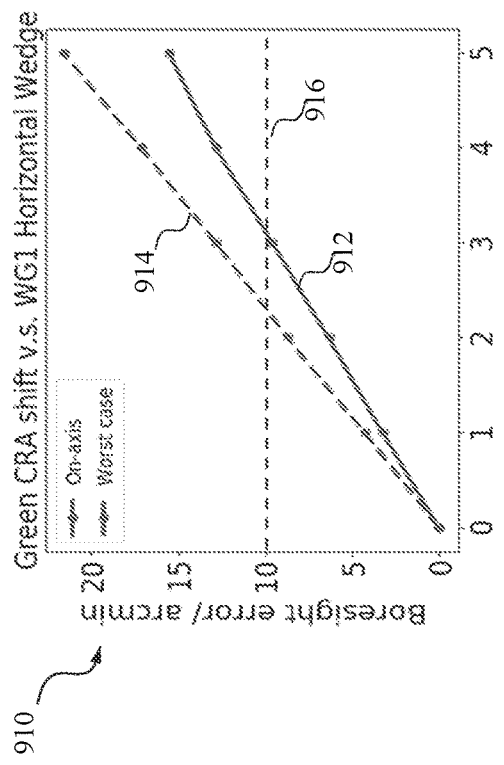

FIG. 9B includes a graph 920 illustrating the modulation transfer function (MTF) of a waveguide display as a function of the wedge angle of the waveguide of the waveguide display. In FIG. 9B, a curve 922 shows the MTF of the waveguide display at 7.5 line pairs per degree (lp/deg), and a line 924 shows the minimum desired MTF of the waveguide display at 7.5 lp/deg. As illustrated, when the wedge angle is greater than about 1 arcsec, the MTF may be blow the desired minimum MTF, and thus the image clarity may be low.

Figure 9C:
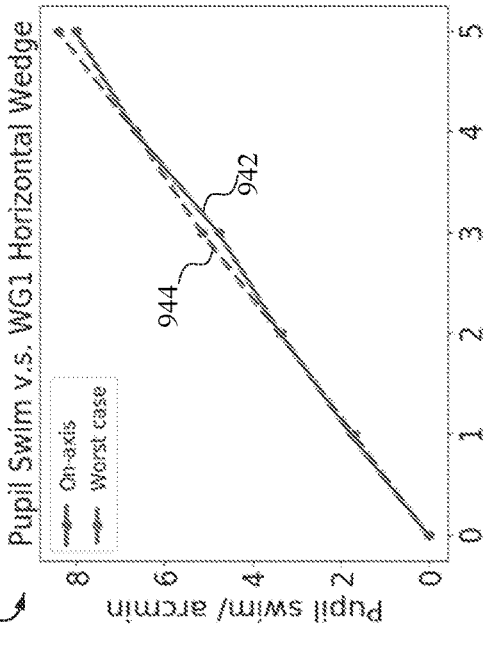

FIG. 9C includes a graph 930 illustrating the lateral color shift of a waveguide display as a function of the wedge angle of the waveguide of the waveguide display. The lateral color shift may cause the separation of images of different colors (e.g., red, green, and blue) at the eyebox of the waveguide display. In FIG. 9C, a curve 932 shows the lateral color shift (in arcmin) of the waveguide display for on-axis light rays of different colors, a curve 934 shows the worst-case lateral color shift for the waveguide display, and a line 936 shows the maximum tolerable lateral color shift of the waveguide display. As illustrated, when the wedge angle is great than about 2 arcsecs, the lateral color shift may be higher than the maximum tolerable lateral color shift, and thus the separation of images of different colors at the eyebox may be noticeable by user's eyes.

Figure 9D:
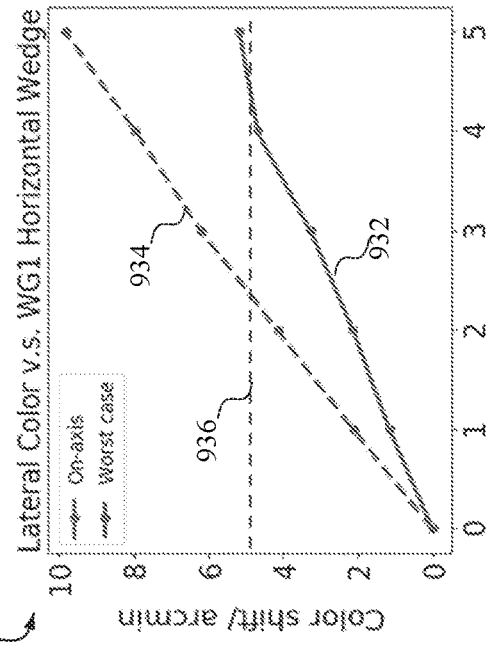

FIG. 9D includes a graph 940 illustrating the pupil swim of a waveguide display as a function of the wedge angle of the waveguide of the waveguide display. In near-eye displays, pupil swim is an image-distorting effect that may occur when user's eyes rotate off the center axis and across the display optics, where the user observed image may be distorted and may change shape when the eyes move around. In FIG. 9D, a curve 942 shows the pupil swim (in arcmin)

of the waveguide display for on-axis objects, and a curve 944 shows the worst-case pupil swim of the waveguide display.

In addition, the thickness variation of the waveguide of a waveguide display may cause other artifacts, such as text breaks and double images. Therefore, to achieve a high image quality and reduce optical artifacts, it may be desirable that the waveguide of a waveguide display has a wedge angle close to zero, such as less than about 1 arcsec, or a TTV of the waveguide is low, such as less than about 1 μm or about 500 nm.

As described above, some correction techniques can be used to control the thickness variation of the waveguide substrate, to reduce TTV and/or wedges of the substrate for fabricating waveguide devices. However, these correction techniques generally polish and grind the entire substrate to reduce TTV and/or wedges. For example, the substrate may be adhered onto a support plate and be thinned down by grinding and polishing using a grinder wheel. In some embodiments, post-treatments such as Ultra Poligrind (UPG), Chemical Mechanical Planarization (CMP), and Dry Polishing (DP) may be performed on the grinded wafer. Due to, for example, wafer bowing during the grinding, global wafer grinding may still leave a high TTV after the correction. For example, the resultant substrate may have a local TTV larger than 1 μm and/or a local wedge larger than 1 arcsec, which may not be sufficient for achieving the desired performance. In some correction techniques, to further reduce the TTV, the contact angle between the grinder wheel and the support plate may need to be adjusted and optimized during the grinding, where, after grinding a certain amount of the substrate material, the TTV of the substrate may be measured, for example, using non-contact gauge (NCG), to determine a new contact angle, and then the support plate or the grinder wheel may be tilted accordingly for further grinding. These grinding and post-treatment techniques may be slow and may be complex to implement. For example, precise measurement of the TTV and precise control of the tilt angle of the grind wheel or the support plate may be needed. In addition, it can be very challenging to planarize a thin substrate (e.g., with a thickness below about 600 or 500 μm) using the grinding techniques, in particular, when both sides of the thin substrate need to be planarized.

According to certain embodiments, when used for fabricating waveguide devices, the thickness of a substrate (e.g., a glass wafer) may be precisely controlled using a localized correction process (e.g., to achieve a local TTV<1 μm) in each of the target areas where waveguide layers and/or surface-relief structures of the waveguide devices may be formed after the correction. For example, an interferometer may be used to measure local and/or global TTVs of the substrate (e.g., the relative thicknesses of different regions within each target area of the substrate), and a thickness correction map may be generated based on the measurement. Then, an etching process (e.g., an ion beam etching process or gas cluster ion-beam etching process) may be performed to etch the target areas of the substrate according to the thickness correction map. For example, the ion beam may scan across different regions of each target area (e.g., in a raster scan), where the duration of the ion beam at each region of the target area may be determined based on the amount of material to be removed at the region, which may be determined based on the thickness correction map. In some embodiments, post processing such as wet chemistry and/or thermal/gas annealing may be performed on the etched substrate to remove etch residues or surface damages. In some embodiments, the planarized target areas of the substrate may be processed through a series of deposition, lithographic patterning, and etching to fabricate waveguide display devices (e.g., grating couplers) in the target areas with improved local TTV. The correction techniques may be applied to substrates having different shapes on one or two surfaces before being corrected by the localized correction process disclosed herein.

Figures 10A, 10B, 10C, 10D:
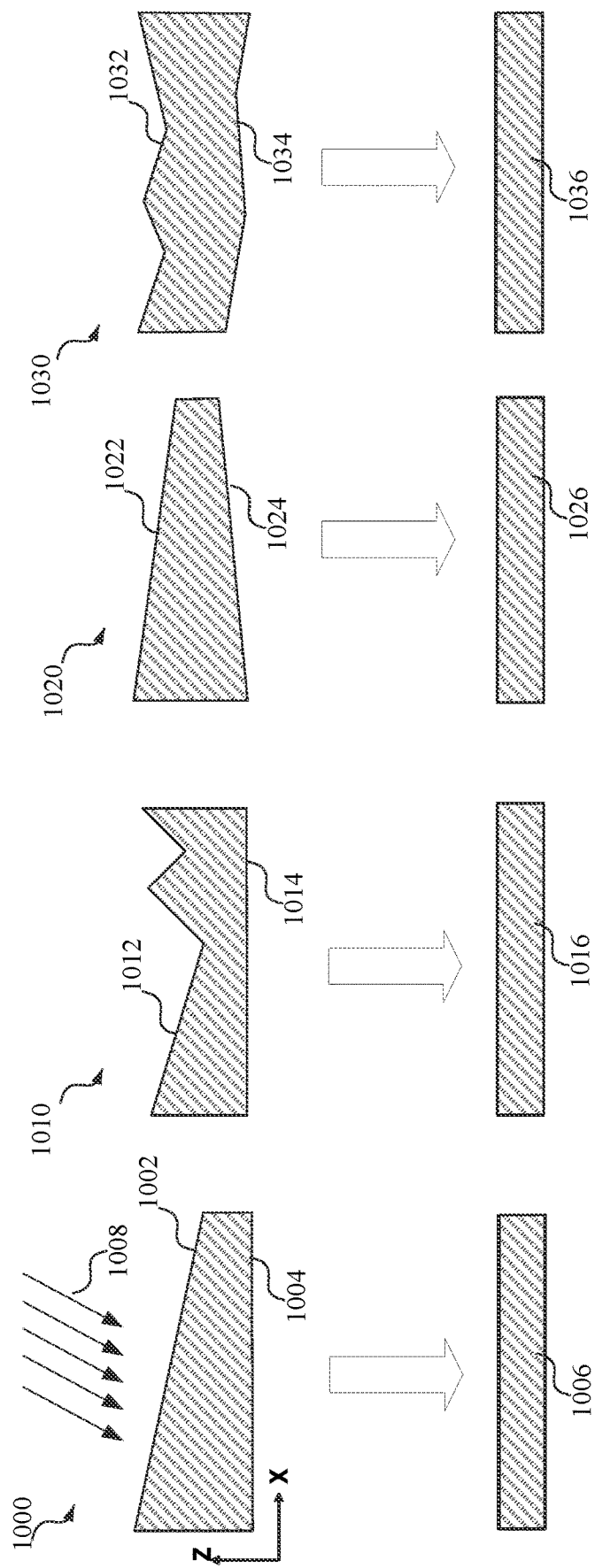
FIGS. 10A-10D illustrate examples of planarizing substrates having different thickness variations.

FIGS. 10A-10D illustrate examples of planarizing substrates having different thickness variations. In some examples as shown in FIG. 10A, a substrate 1000 may include a single side wedge, where one surface of substrate 1000 (e.g., a frontside 1002) may have a slope and the other surface of substrate 1000 opposite to frontside 1002 (e.g., a backside 1004) may be flat. Specifically, the highest substrate thickness of substrate 1000 is on one edge of substrate 1000 and the substrate thickness of substrate 1000 gradually reduces towards the opposite edge of substrate 1000, along x axis and/or y axis. To make a flat substrate 1006 from substrate 1000, different amounts of material may need to be removed from different regions of substrate 1000, for example, by etching using an ion beam 1008 that may be straight or slanted.

In some examples as shown in FIG. 10B, a substrate 1010 may have an uneven surface, where one surface of substrate 1010 (e.g., a frontside 1012) may have an irregular shape and the other side of substrate 1010 opposite to frontside 1012 (e.g., a backside 1014) may be flat. Specifically, the thickness of substrate 1010 may have more than one local maximum and more than one local minimum along the x axis and/or y axis. To make a flat substrate 1016 from substrate 1010, different amounts of material may be removed from different regions of substrate 1010, for example, by etching using ion beam 1008 that may be straight or slanted.

In some examples as shown in FIGS. 10C and 10D, a substrate 1020 and a substrate 1030 may have a wedge shape and an irregular shape, respectively, at one side (e.g., a frontside 1022 or 1032) as shown in FIGS. 10A and 10B. In addition, substrate 1020 and substrate 1030 may also have a wedge shape and an irregular shape, respectively, at another side (e.g., a backside 1024 or 1034). Thus, substrate 1020 and substrate 1030 may have a wedge shape or an irregular shape on each of two opposite sides. As such, the thickness variation correction may need to be performed on both sides to make a flat substrate 1026 and a flat substrate 1036. It is contemplated that the substrates for fabricating waveguide devices are not limited to the exemplary substrates described above, and may have any regular or irregular surface shapes or profiles. The substrates may be transparent substrates with refractive indices between about 1.4 and about 2.7 or higher (e.g., fused silica, $LiNiBO_3$, high index glass, etc.).

The localized correction techniques disclosed herein may be performed on a single side (e.g., frontside 1002, 1012, 1022, or 1032) or both sides (e.g., frontside 1002, 1012, 1022, or 1032, and backside 1004, 1014, 1024, or 1034) of the substrate (e.g., substrates 1000, 1010, 1020, or 1030). For example, when performing the single-sided substrate correction, certain areas of the frontside of the substrate may be corrected to match (e.g., be parallel to) the backside of the substrate for controlling the local TTV of the substrate (e.g., to reduce TTV of target areas on the substrate).

In some embodiments, the ion beam used to remove materials in the target areas may include non-reactive gas (e.g., ion beam etching (IBE) or gas cluster ion beam (GCIB)), where noble inert gases such as Ar, Xe, Ne, or Kr may be used for physical etching or sputtering. In some embodiments, the ion beam may include reactive gas (e.g., reactive ion beam etching (RIBE) and/or chemically assisted ion beam etching (CAIBE)), where a chemically reactive gas such as $SF_6$, $CHF_3$, $CF_4$, $O_2$, or $Cl_2$ may be added to Ar or other inert gas. In some embodiments, the ion beam etching may be followed by post-processing(s) (e.g., wet chemistry substrate cleaning and/or thermal annealing) to remove the etch residues and/or surface damages.

Ion beams may remove materials from the surfaces of the target areas of the substrate by delivering (e.g., in a vacuum chamber) high-energy ions to the substrate surfaces (e.g., a glass wafer). In ion beam etchings, ions impinge on the surface of the substrate to be corrected and remove material through either direct physical momentum transfer (e.g., sputtering) or a chemical reaction initiated by the energy transfer from the ions (e.g., RIBE or CAIBE). For example, RIBE may involve utilization of an ion that can chemically react with the substrate, such as oxygen, fluorine, and the like. In CAIBE, an inert ion may initiate a chemical reaction between the substrate and a reactant (e.g., an applied gas that is adsorbed on the surface), generate a reactive site on the surface of the substrate that reacts with an applied reactant coincident with or subsequent to the generation of the reactant site, or any combination thereof. Similarly, GCIBs use cluster ion beams which may be ionized and filtered to travel in a direction substantially perpendicular to the surface of the substrate to be corrected. Ions may be accelerated by an electric field to attain a desired kinetic energy and may dissociate into gaseous species, such as molecules and charged molecules, when the ions hit the surface of the substrate.

In some embodiments, the ion beam may be scanned, according to a raster pattern, across target areas determined based on the thickness correction map, which may in turn be determined based on the local TTV measured using the interferometer. For example, when scanning, the ion beam can be modulated to have a spot size from about 0.1 mm wide to about a few millimeter (e.g., 2-3 mm) wide, depending on, for example, the desired resolution of the correction process. Specifically, if the correction process needs a high resolution, a small ion beam (e.g., less than about 0.5 mm spot size) may be generated and used. During the scanning, given a spot size of the ion beam, the duration of the ion beam at each region of the target area may be determined based on the amount of material to be removed by the ion beam etching (e.g., determined based on the measured local TTV at the region of the target area) and the etch rate.

In some embodiments, after the correction process and prior to further fabricating the waveguide device, post processing such as wet chemistry cleaning and/or thermal annealing may be performed to the corrected substrate to smooth the substrate surface (e.g., remove etch residue or substrate surface damages). Then the substrate may be processed through a series of deposition, lithographic patterning and etching, nanoimprinting, and/or holographic recording, to further fabricate waveguide devices, such as grating couplers, in the corrected areas (e.g., areas with reduced local TTV).

In some embodiments, when fabricating multi-layer waveguide display devices, the substrate for fabricating each waveguide layer may be corrected individually using the correction techniques disclosed herein before being bonded or laminated together. For example, each substrate may be corrected according to the correction techniques disclosed herein. After the correction, the locally corrected substrates may be stacked and be bonded (e.g., using adhesive bonding) or laminated according to the structure of the multi-layer waveguide display device, before being singulated (e.g., through a dicing process) to form each multi-layer waveguide display device.

In some embodiments, two TTV-corrected substrates may be bonded or laminated with optically clear adhesives (OCAs) (e.g., liquid OCAs such as Norland Optical Adhesive 74). For example, the OCA may be disposed between a bottom substrate and a top substrate (e.g., the OCA can be sandwiched by the bottom and top substrates). The two substrates can be pushed against each other by applying pressures (e.g., mechanical pressure, vacuum pressure, etc.) to a bottom side surface of the bottom substrate and a top side surface of the top substrate respectively. The OCA can then be cured (e.g., using ultraviolet light). The bonded substrates may be diced to form individual multi-layer waveguide display device. Accordingly, only one dicing step may be needed to form individual multi-layer waveguide devices from base substrates when fabricating multi-layer waveguide display devices. There is no need to dice each waveguide layer and then bond the waveguide layers individually.

In some embodiments, when fabricating multi-layer waveguide display devices, the substrate for fabricating each waveguide layer may be individually corrected using the disclosed techniques. The TTV-corrected target areas may be singulated (e.g., through a dicing process) before being stacked, and may then be bonded or laminated together to form the multi-layer waveguide display device. For example, each substrate may be corrected according to the correction techniques disclosed herein. In some embodiments, after the correction, the TTV-corrected target areas may be singulated and may be stacked and be bonded (e.g., using adhesive bonding) or laminated with other TTV-corrected target areas (e.g., from a same or a different corrected substrate) according to the structure of the multi-layer waveguide display device to form each multi-layer waveguide display device. For example, two TTV-corrected target areas singulated from one or two substrates and having opposite thickness variations or wedge angles may be selected and stacked such that they may compensate the thickness variation of each other to form a layer stack with a low total thickness variation or a small wedge angle.

In some embodiments, two TTV-corrected target areas may be bonded or laminated with optically clear adhesives (OCAs) (e.g., liquid OCAs such as Norland Optical Adhesive 74). For example, the OCA may be disposed between a bottom substrate and a top substrate (e.g., the OCA can be sandwiched by the bottom and top substrates). The two TTV-corrected target areas can be pushed against each other by applying pressures (e.g., mechanical pressure, vacuum pressure, etc.) to a bottom side surface of the bottom substrate and a top side surface of the top substrate respectively. The OCA can then be cured (e.g., using ultraviolet light).

Figure 11A:
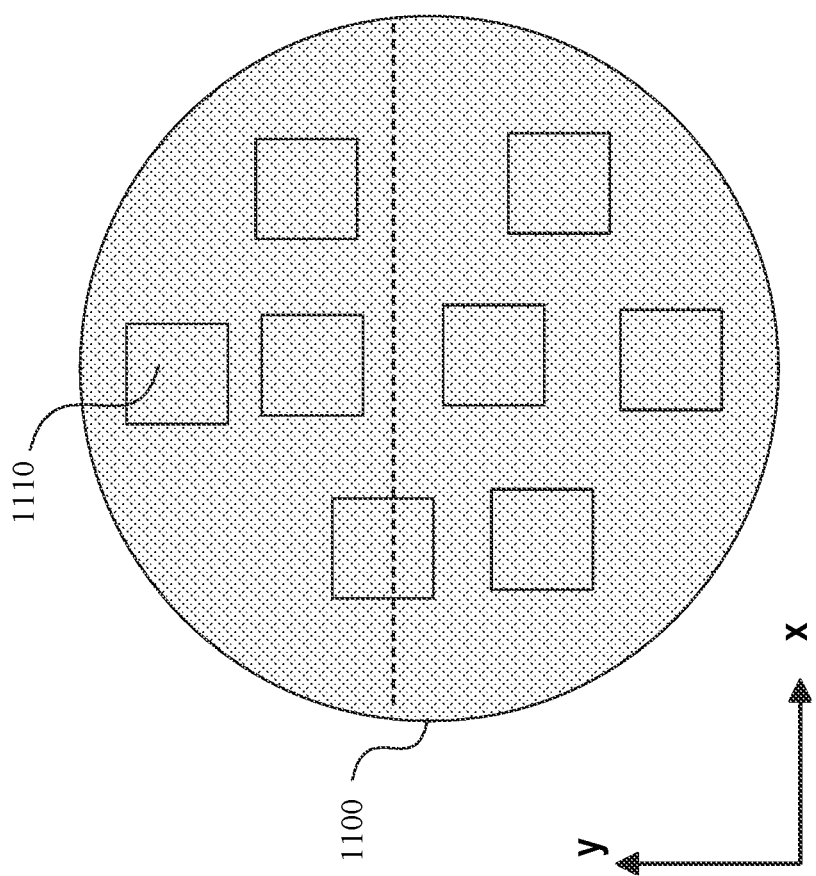
FIGS. 11A-11F illustrate an example of a method of fabricating a multi-layer waveguide display device with reduced total thickness variation (TTV) according to certain embodiments.

FIGS. 11A-11F illustrate an example of a method of fabricating a multi-layer waveguide display device with reduced total thickness variation (TTV). FIG. 11A shows a top view of a substrate 1100 for fabricating waveguide display devices according to certain embodiments. Substrate 1100 may include one or more target areas 1110 suitable for fabricating waveguide layers and/or other optical elements (e.g., grating couplers) of waveguide display devices. In some embodiments, substrate 1100 may have a thickness (e.g., in z axis) no higher than 800 μm, such as between about 100 μm and about 600 μm, and may have a width (e.g., the diameter in x-y plane) of about 10 cm to about 70 cm (e.g., about 30 cm). Substrate 1100 may be in a circular shape viewing from the top as illustrated in FIG. 11A, and may include one or more target areas 1110 distributed evenly or unevenly, depending on, for example, the desired size and shape of the waveguide layers or the optical elements.

In some embodiments, before being corrected, substrate 1100 including target areas 1110 may have a large TTV (e.g., a TTV greater than about 5 μm). In some embodiments, substrate 1100 may be transparent to visible light, and may have a refractive index, for example, between about 1.4 and about 2.7. For example, substrate 1100 may include, for example, glass, silicon, silicon nitride, silicon carbide, $LiNbO_3$, $TiO_2$, SiC, CVD diamond, ZnS, or any other suitable material. It is contemplated that substrate 1100 may be in any suitable shape (e.g., elliptic, quadrilateral, hexagonal, etc.) suitable for fabricating waveguide display devices.

Target areas 1110 may include one or more (e.g., 1, 2, 3, 5, 6, 10, etc.) target areas, each of which may correspond to an area where a waveguide layer and/or an optical element (e.g., a surface-relief structure) of the waveguide display device may be formed. The one or more target areas of target areas 1110 may be distributed evenly, unevenly, and/or according to any desired pattern on substrate 1100. Each target area 1110 may have a regular shape (e.g., rectangle, square, circle, or oval), or an irregular shape (e.g., a shape that may fit in a frame of the waveguide display device). Each target area 1110 may have a width about, for example, 20-60 mm, and may be characterized by an area greater than, for example, about 1 square centimeter or larger (e.g., greater than about 4 $cm^2$, 6 $cm^2$, 8 $cm^2$, or 10 $cm^2$).

Figure 11B:
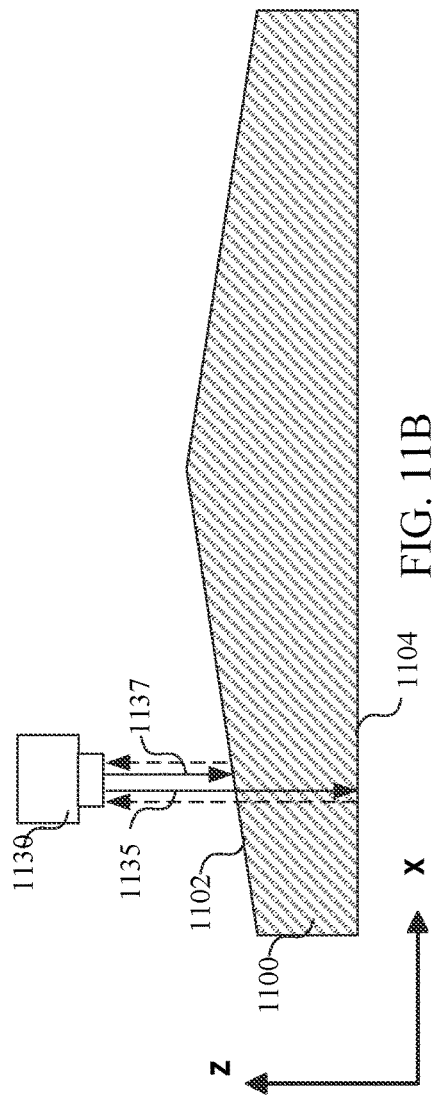

FIG. 11B shows that substrate 1100 may be measured using an interferometer 1130 to generate a thickness correction map. An interferometer may use two or more light beams to create an interference patten. For example, a coherent light beam may be split into two light beams (e.g., light beams 1135 and 1137) that travel in different optical paths (e.g., reflected at a bottom surface 1104 and a top surface 1102, respectively), and the reflected light beams are then combined to produce an interference pattern, which can be measured and analyzed for determining a TTV of substrate 1100. The interference pattern may indicate the phase difference and thus the optical path length difference between the two reflected beams. For example, at certain regions of substrate 1100, the two beams reflected from top surface 1102 and bottom surface 1104 may be in phase, and thus they may constructively interfere to generate a bright fringe in these regions. At certain regions, the two reflected beams may be out of phase, and thus they may destructively interfere to generate dark fringes in these regions. If substrate 1100 has a uniform thickness, the interference pattern may include no fringes. Thus, the thickness of substrate 1100 at a given location and/or the TTV may be determined by analyzing the interference pattern.

In some embodiments, interferometer 1130 may scan and measure the entire substrate 1100 and generate a thickness map (e.g., a contour map) indicating local TTVs of substrate 1100 (e.g., including TTV for each of the target areas 1110). For example, the thickness map may indicate the thickness variation within each of target areas 1110 (e.g., the difference between the minimum thickness and maximum thickness measured within the target area). In some other embodiments, interferometer 1130 may scan and measure only target areas 1110 for generating the thickness map indicating the TTV for each of target areas 1110.

In some embodiments, a thickness correction map indicating the amount of material to be removed in each region of target areas 1110 may be generated based on the thickness map. For example, the amount of material to be removed may correlate to the value of the local TTV determined in the thickness map. In some embodiments, the thickness correction map or an ion source control map that controls the duration of the ion beam at each location may be fed to a controller of an ion source (e.g., in a feedforward manner) for ion beam etching of substrate 1100.

Figure 11C:
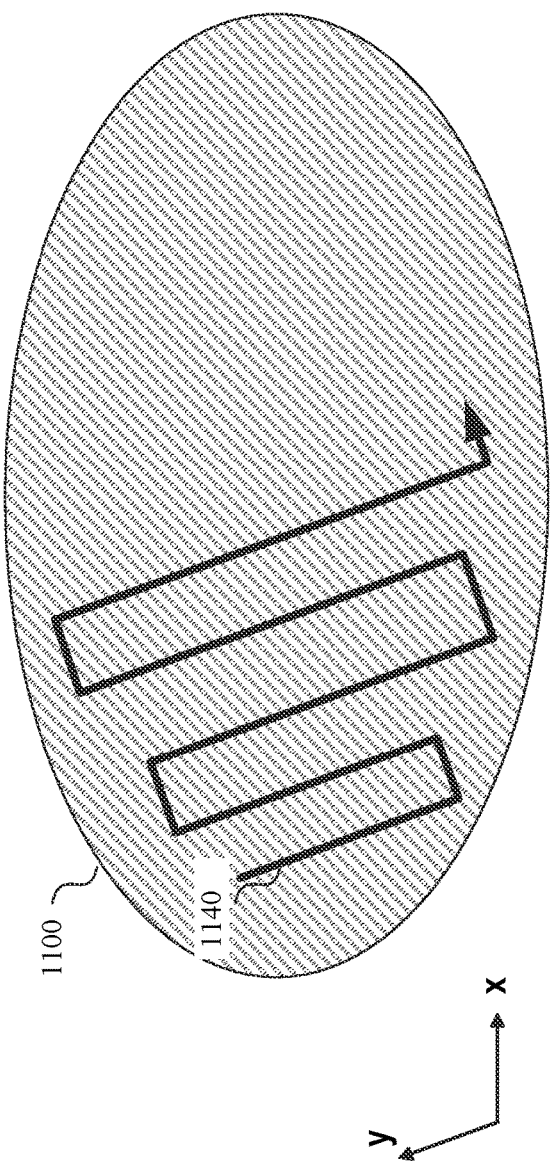

FIG. 11C shows that substrate 1100 may be corrected according to the thickness correction map using ion beam etching. In some embodiments, the ion beam may scan across the target areas based on mask-less techniques or greyscale lithography techniques. In some embodiments, the ion beam may scan across substrate 1100 according to a scanning path 1140 determined based on the thickness correction map or a control map fed to the controller of the ion source. As described above, the ion beam etching may be non-reactive gas-based (e.g., IBE), reactive gas-based (e.g., RIBE or CAIBE), or gas cluster ion-based (e.g., GCIB). In some embodiments, after the correction, a local TTV in each of target areas 1110 may be lower than about 1 μm (e.g., lower than about 0.5 μm, about 0.3 μm, or about 0.1 μm).

In some embodiments, when scanning, the spot size of the ion beam can be modulated to be, for example, from less than about 0.1 mm wide to about a few millimeters (e.g., 2-3 mm) wide (e.g., measured in the x-y plane), depending on the desired resolution. For example, if the correction process needs a high resolution, a small ion beam spot size (e.g., 0.1 mm wide) may be used. Otherwise, if a low resolution is sufficient, a large ion beam spot size (e.g., about 2 mm to about 3 mm wide) may be used.

During the scanning, given the spot size (and intensity) of the ion beam, the duration of the ion beam at each region of the target area may be determined based on the amount of material to be removed (e.g., determined based on the measured local TTV of the target area) and the etch rate of the ion beam etching. For example, the duration of the ion beam at each region of the target area may correlate with the amount of material to be removed at the region to achieve a desired thickness and thickness uniformity.

Figure 11E:
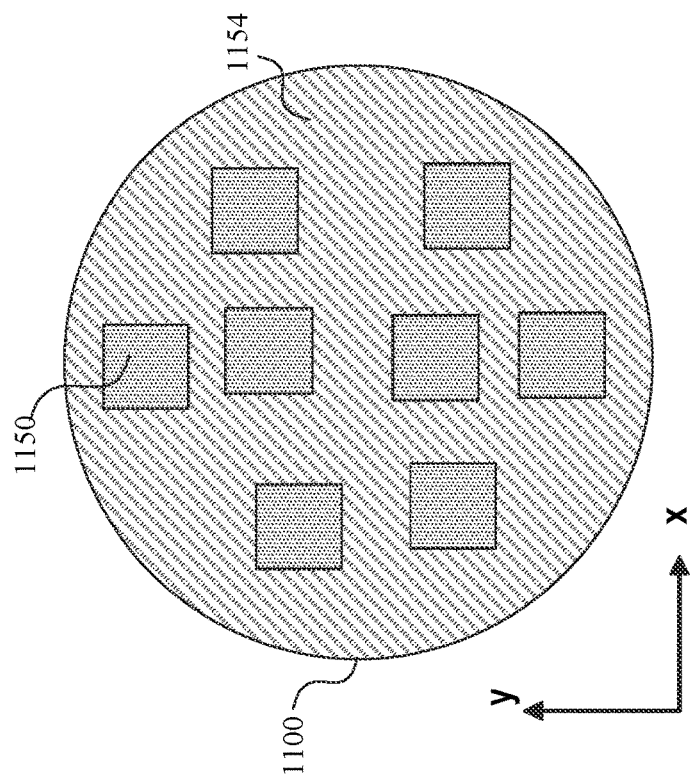
Figure 11D:
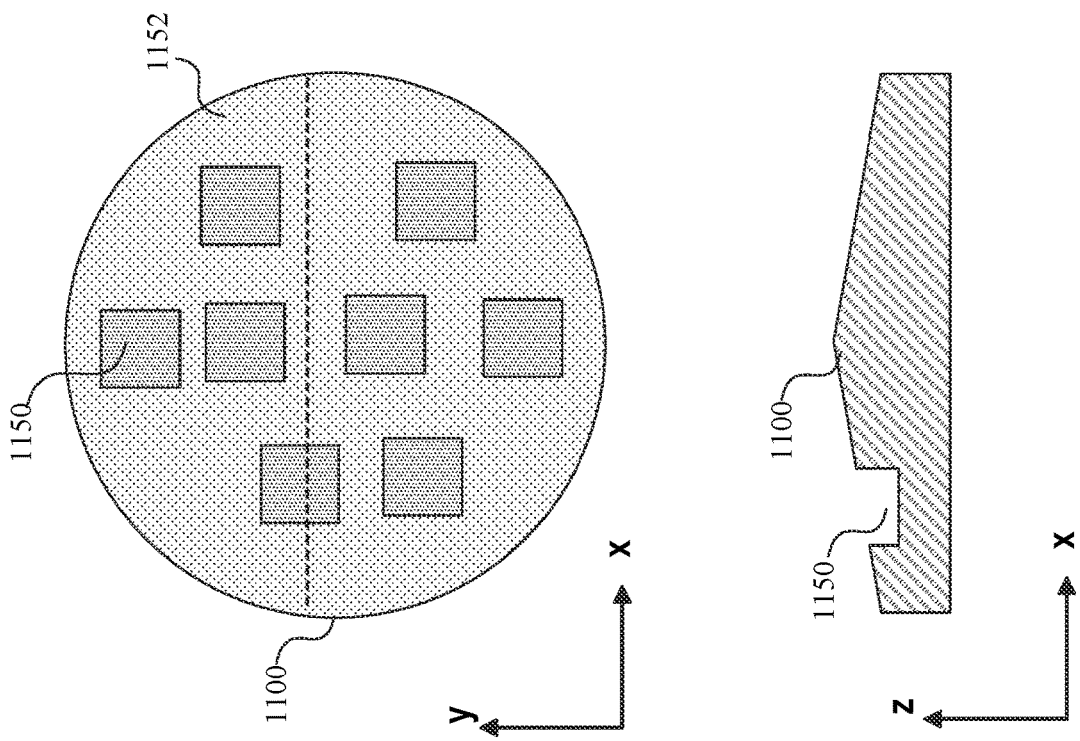

FIGS. 11D and 11E show that, after being corrected by localized ion beam etching and prior to further fabricating the waveguide display device, substrate 1100 may optionally be post processed to remove etch residues and/or substrate surface damages. As illustrated in FIG. 11D, after the correction, target areas 1110 may be corrected into waveguide device areas 1150 with improved TTVs and desired thickness (e.g., between about 100 μm and a few hundred micrometers). In some embodiments, etching residues and substrate surface damages may be generated on a resultant frontside surface 1152 of substrate 1100 after the correction, and post processing may be performed to improve the surface condition of substrate 1100. For example, a wet chemistry treatment and/or thermal annealing may be performed on the corrected substrate 1100 to improve the quality of the surface of substrate 1100 (e.g., to remove etch residues and/or substrate surface damages) and generate an improved frontside surface 1154 as illustrated in FIG. 11E. In some embodiments, a series of deposition, lithographic patterning and etching, nanoimprinting, and/or holographic recording may be performed in the corrected waveguide device areas 1150 of substrate 1100 to fabricate optical elements (e.g., grating couplers) for waveguide display devices in waveguide device areas 1150 with improved local TTV.

Figure 11F:
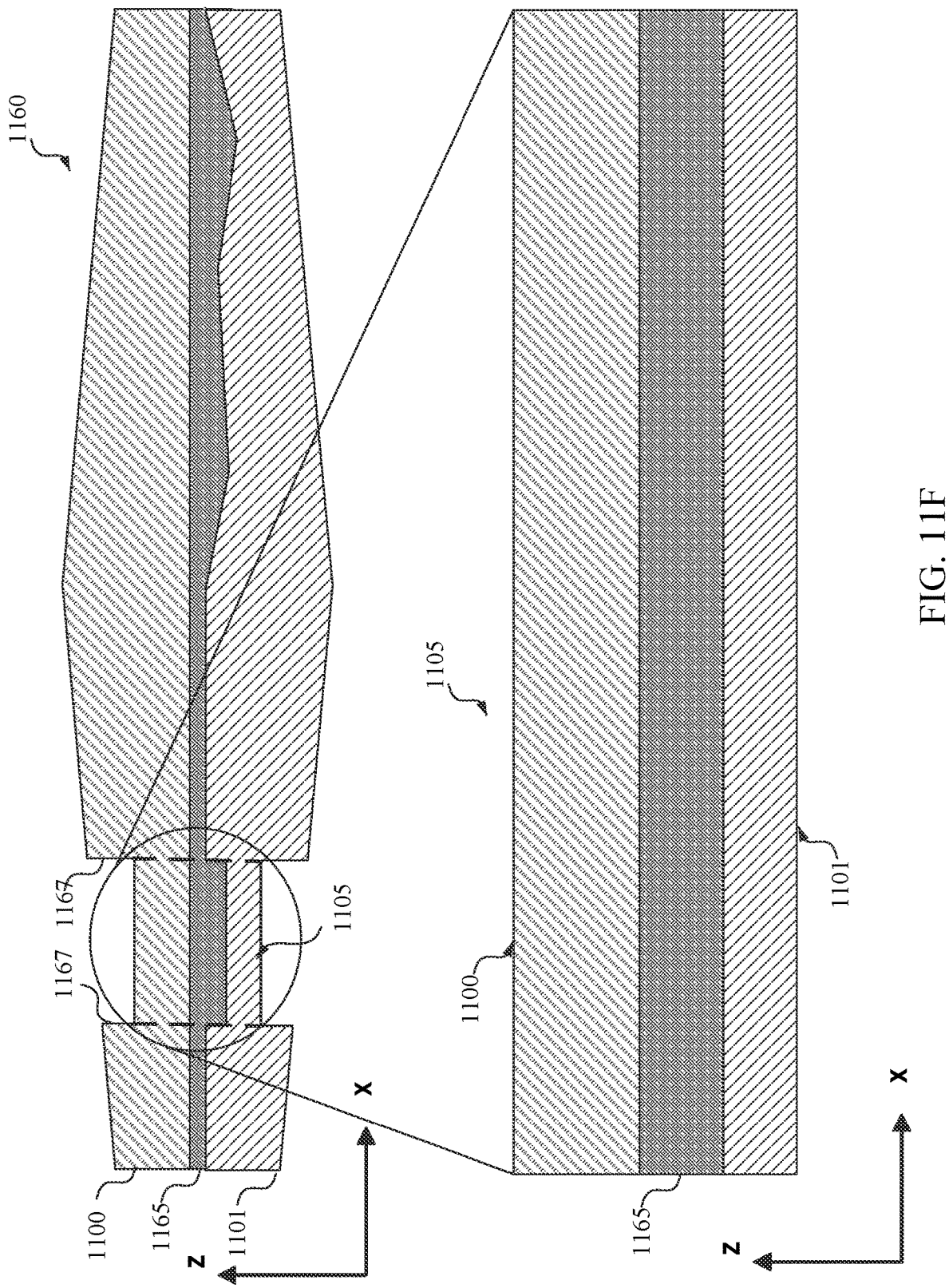

FIG. 11F shows substrate 1100 may be stacked and be bonded or laminated with one or more other corrected substrates 1101 according to the structure of a multi-layer waveguide device (e.g., aligning/matching corresponding waveguide device area on substrates 1100 and 1101 according to the structure of waveguide display 602, 700, or 702 described above) to form a bonded substrate stack 1160. For example, adjacent locally corrected substrates (e.g., substrates 1100 and 1101) may be bonded or laminated with OCA 1165 (e.g., liquid OCAs such as Norland Optical Adhesive 74). For example, OCA 1165 may be disposed between a bottom substrate (e.g., substrate 1101) and a top substrate (e.g., substrate 1100, where the OCA can be sandwiched by the bottom and top substrates). Substrates 1100 and 1101 can be pushed together by applying pressures (e.g., mechanical pressure, vacuum pressure, etc.) to a bottom side surface of substrate 1101 and a top side surface of substrate 1100. OCA 1165 can then be cured, for example, using ultraviolet light.

In some embodiments, bonded substrate stack 1160 may be diced to form individual multi-layer waveguide devices (e.g., multi-layer waveguide devices 1105). For example, bonded substrate stack 1160 may be diced (e.g., along dash lines 1167) based on the size and shape of the individual multi-layer waveguide devices. As illustrated in FIG. 11F and as described above with respect to FIGS. 6B-7B, multi-layer waveguide device 1105 may include one or more waveguide layers, where each waveguide layer may be corrected and bonded or laminated according to the techniques disclosed herein. Accordingly, multi-layer waveguide device 1105 may have reduced TTV and may have reduced chief ray angle shift, modulation transfer function degradation, lateral color aberration, pupil swim, text breaks, and double images, and the like that may otherwise be caused by the thickness variation or wedge shape of the substrates.

Figure 12:
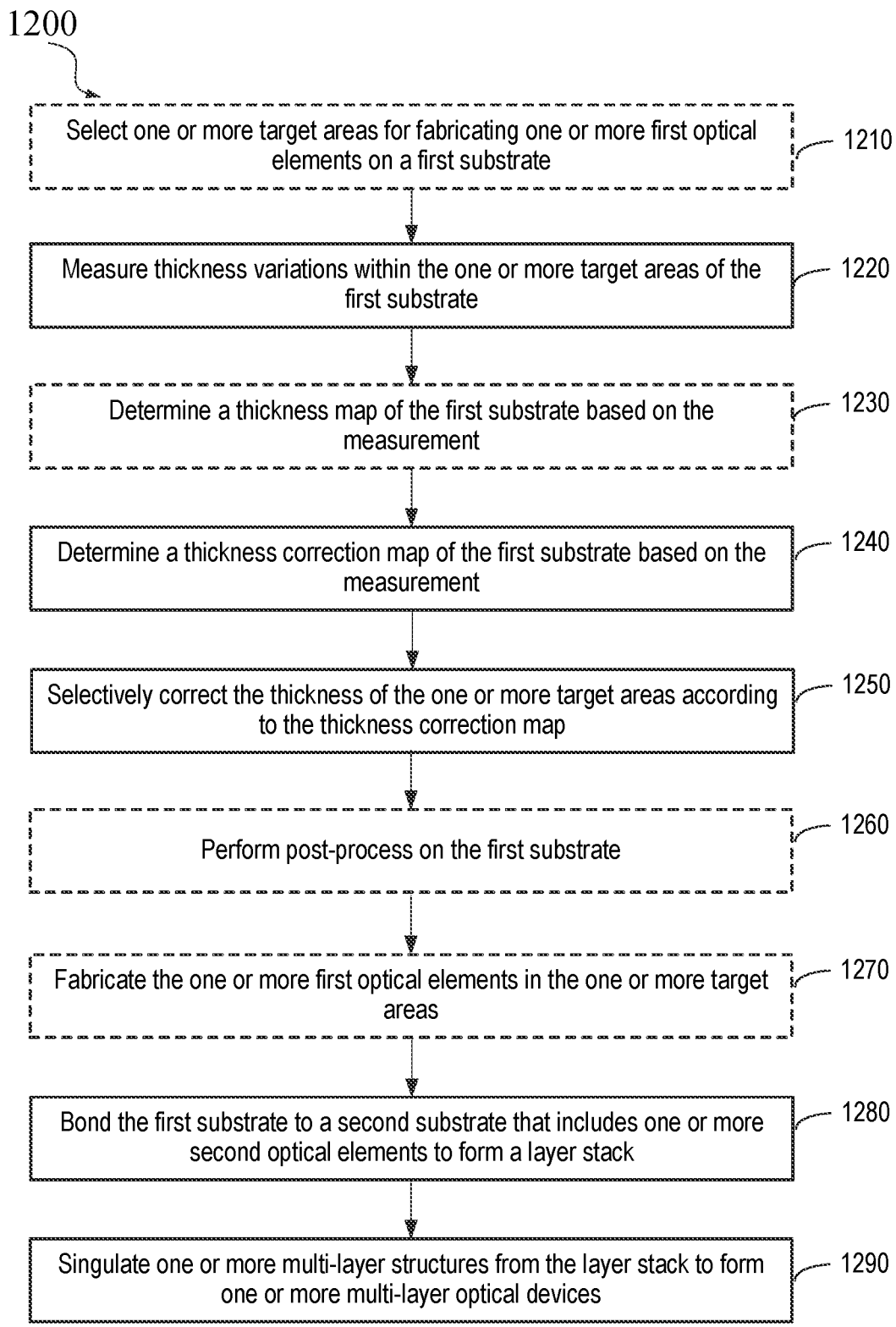
FIG. 12 is a flowchart illustrating an example of a process for fabricating a waveguide display device with reduced TTV according to certain embodiments.

FIG. 12 includes a flowchart 1200 illustrating an example of a process for fabricating a multi-layer waveguide display with reduced TTV according to certain embodiments. The operations described in flowchart 1200 are for illustration purposes only and are not intended to be limiting. In various implementations, modifications may be made to flowchart 1200 to add additional operations, to omit some operations, or to change the order of the operations. The operations described in flowchart 1200 may be performed by, for example, one or more fabrication systems, such as an ion beam etching (IBE), a cluster ion beam etching, and the like.

At block 1210, one or more target areas may optionally be selected for fabricating one or more optical elements (e.g., waveguide layers and/or other optical elements of waveguide display devices, such as grating couplers) on a first substrate (e.g., a glass wafer). In some embodiments, the first substrate (e.g., substrate 1100 in FIG. 11A) may be in a circular shape viewing from the top and may include one or more target areas (e.g., target areas 1110) distributed evenly or unevenly, depending on, for example, the desired size and shape of the waveguide layers or the optical elements. It is contemplated that the substrate may be in any shape (e.g., elliptic, quadrilateral, hexagonal, etc.) suitable for fabricating waveguide display devices. The target areas may include one or more (e.g., 1, 2, 3, 5, 6, 10, etc.) target areas, each of which may correspond to an area where a waveguide layer and/or an optical element (e.g., a surface-relief structure) of the waveguide display device may be formed. The one or more target areas of the target areas may be distributed according to any desired pattern on the first substrate. Each of the target area may have a regular shape (e.g., rectangle, square, circle, or oval), or an irregular shape (e.g., a shape that may fit in a frame of the waveguide display device). Each target area may have a width about, for example, 20-60 mm. Each target area may have an area greater than, for example, 0.1 cm$^2$ and may have a thickness less than about 800 µm (e.g., about 600 µm). In some embodiments, the first substrate may have a thickness equal to or less than about 1 mm.

At block 1220, thickness variations within the one or more target areas of the first substrate may be measured. For example, an interferometer (e.g., interferometer 1130 shown in FIG. 11B) may use two or more light beams to create an interference patten. In one example, a coherent light beam may be split into two light beams (e.g., light beams 1135 and 1137) that travel in different optical paths (e.g., reflected at a bottom surface 1104 and a top surface 1102, respectively), and the reflected light beams may then be combined to produce an interference pattern, which can be measured and analyzed for determining the thickness and the TTV of a designated area of the first substrate (e.g., substrate 1100). In some embodiments, the interferometer may scan and measure the entire first substrate to measure thickness variations (e.g., a global TTV) of the first substrate. In some embodiments, the interferometer may scan and measure only the one or more target areas of the first substrate to measure thickness variations (e.g., local TTVs) within each of the one or more target areas.

At block 1230, a thickness map (e.g., a contour map) indicating local TTVs of the first substrate (e.g., including TTV for each of the one or more target areas, such as target areas 1110 shown in FIG. 11A) may optional be determined based on the thickness variation measurements. For example, the thickness map may indicate the thickness variation within each of the one or more target areas (e.g., the difference between the minimum thickness and maximum thickness measured within each target area).

At block 1240, a thickness correction map indicating the amount of material to be removed in different regions of each target area of the one or more target areas may be generated based on the thickness map. For example, the amount of material to be removed may correlate to the value of the local TTV determined in the thickness map. In some embodiments, the thickness correction map or an ion source control map that determines the duration of the ion beam at each location may be fed to a controller of an ion source for ion beam etching of the first substrate.

At block 1250, the first substrate may be selectively planarized/corrected according to the thickness correction map using ion beam etching. For example, only the one or more target areas of the first substrate may be selectively planarized according to the thickness correction map using localized ion beam etching. In some embodiments, the ion beam may scan across the target areas based on mask-less techniques or greyscale lithography techniques. In some embodiments, the ion beam may scan across the first substrate according to a scanning pattern determined based on the thickness correction map or ion source control map fed to the controller of the ion source. As described above, the ion beam etching may be non-reactive gas-based (e.g., IBE), reactive gas-based (e.g., RIBE or CAIBE), or gas cluster ion-based (e.g., GCIB). The ion beam may be modulated (e.g., focused) to have a desired beam spot size, such as with a width less than about 0.5 mm, 0.2 mm, or 0.1 mm. In some embodiments, both the top surface and the bottom surface of the one or more target areas of the first substrate may be planarized.

In some embodiments, at block 1260, after being corrected by localized ion beam etching and prior to further fabricating the waveguide display device, the first substrate may optionally be post processed to remove etch residues or surface damages. For example, a wet chemistry treatment and/or thermal annealing process may be performed on the planarized/corrected first substrate to improve the quality of the surface of the first substrate (e.g., to remove etch residues and/or surface damages.

In some embodiments, at block 1270, a series of deposition, lithographic patterning and etching, nanoimprinting, and/or holographic recording operations may be performed on the thickness-corrected target areas of the first substrate to further fabricate optical elements (e.g., grating couplers) for waveguide display devices in only the thickness-corrected target areas (e.g., areas with low local TTV or small wedge angle).

At block 1280, the first substrate may be bonded or laminated to one or more other substrates (e.g., thickness-corrected substrates) according to the structure of a multi-layer waveguide device to form a layer stack. In some embodiments, the planarized target areas of the first substrate may be aligned/matched with the corresponding target areas or optical elements on other substrate(s) according to the structure of the multi-layer waveguide device (e.g., waveguide display 600, 700, or 702) to form one or more multi-layer structures (e.g., multi-layer waveguides). For example, adjacent corrected substrates (e.g., the first substrate and a second substrate) may be bonded with an OCA (e.g., liquid OCAs such as Norland Optical Adhesive 74). For example, the OCA may be disposed between a bottom substrate (e.g., the first substrate) and a top substrate (e.g., the second substrate), where the OCA may be sandwiched by the bottom and top substrates. The bottom and top substrates can be pushed together by applying pressures (e.g., mechanical pressure, vacuum pressure, etc.) to a bottom surface of the first substrate and a top surface of the second substrate. The OCA can then be cured, for example, using ultraviolet light to bond the first substrate and the second substrate.

At block 1290, the multi-layer structures may be singulated from the layer stack to form individual multi-layer waveguide devices (e.g., multi-layer waveguide device 1105 shown in FIG. 11F). For example, the layer stack may be diced based on the size and shape of the individual multi-layer waveguide device (e.g., multi-layer waveguide device 1105). Accordingly, the multi-layer waveguide device may include one or more waveguide layers, each layer being fabricated, corrected, and bonded or laminated according to the techniques disclosed herein. As a result, the multi-layer waveguide device may have reduced TTV and reduced chief ray angle shift, modulation transfer function degradation, lateral color aberration, pupil swim, text breaks, and double images, and the like, which may otherwise be caused by the thickness variation of the substrates.

Embodiments of the invention may include or be implemented in conjunction with an artificial reality system. Artificial reality is a form of reality that has been adjusted in some manner before presentation to a user, which may include, for example, a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, for example, create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Figure 13:
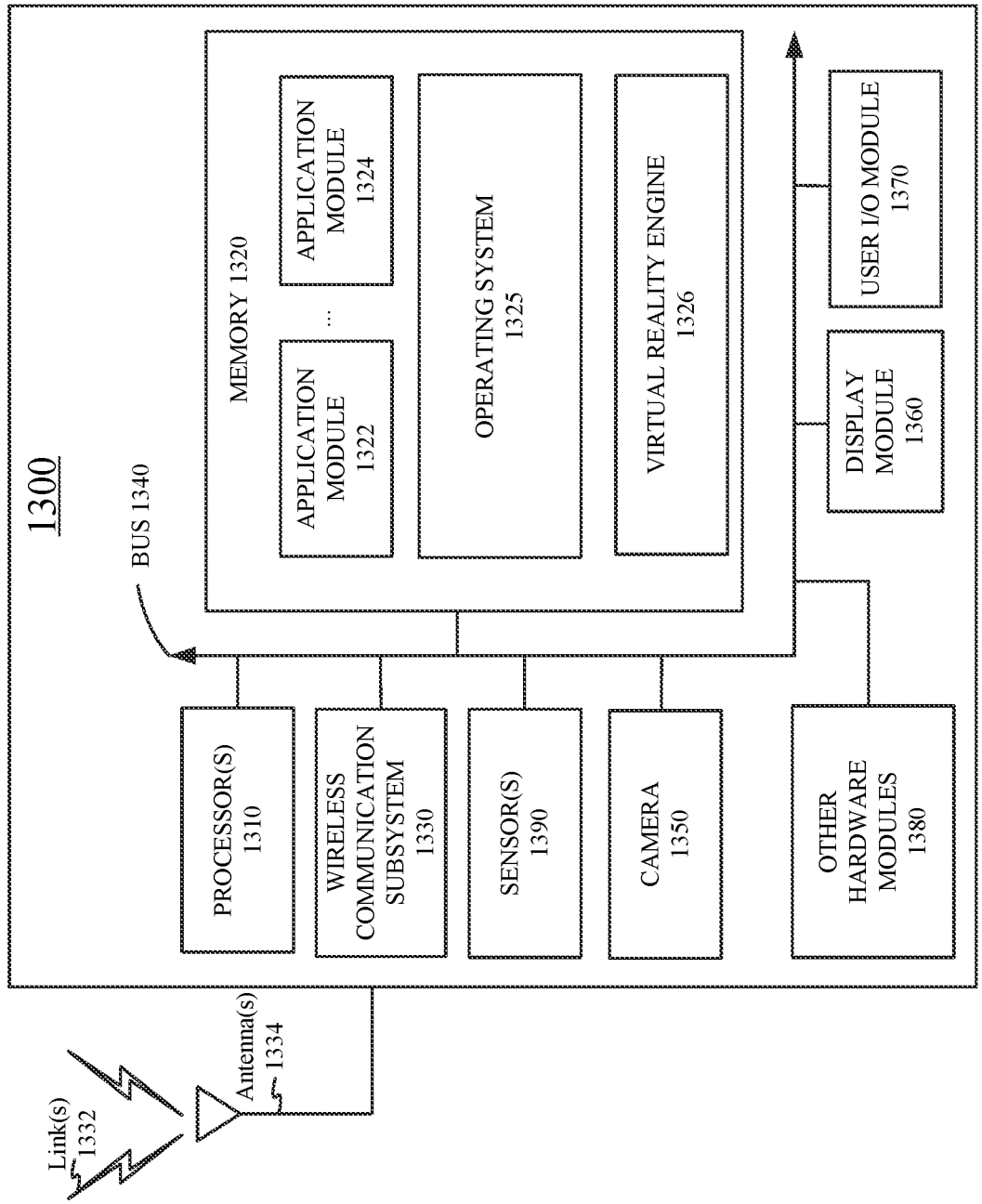
FIG. 13 is a simplified block diagram of an electronic system of an example of a near-eye display for implementing some of the examples disclosed herein.

FIG. 13 is a simplified block diagram of an electronic system 1300 of an example of a near-eye display (e.g., HMD device) for implementing some of the examples disclosed herein. Electronic system 1300 may be used as the electronic system of an HMD device or other near-eye displays described above. In this example, electronic system 1300 may include one or more processor(s) 1310 and a memory 1320. Processor(s) 1310 may be configured to execute instructions for performing operations at a number of components, and can be, for example, a general-purpose processor or microprocessor suitable for implementation within a portable electronic device. Processor(s) 1310 may be communicatively coupled with a plurality of components within electronic system 1300. To realize this communicative coupling, processor(s) 1310 may communicate with the other illustrated components across a bus 1340. Bus 1340 may be any subsystem adapted to transfer data within electronic system 1300. Bus 1340 may include a plurality of computer buses and additional circuitry to transfer data.

Memory 1320 may be coupled to processor(s) 1310. In some embodiments, memory 1320 may offer both short-term and long-term storage and may be divided into several units. Memory 1320 may be volatile, such as static random access memory (SRAM) and/or dynamic random access memory (DRAM) and/or non-volatile, such as read-only memory (ROM), flash memory, and the like. Furthermore, memory 1320 may include removable storage devices, such as secure digital (SD) cards. Memory 1320 may provide storage of computer-readable instructions, data structures, program modules, and other data for electronic system 1300. In some embodiments, memory 1320 may be distributed into different hardware modules. A set of instructions and/or code might be stored on memory 1320. The instructions might take the form of executable code that may be executable by electronic system 1300, and/or might take the form of source and/or installable code, which, upon compilation and/or installation on electronic system 1300 (e.g., using any of a variety of generally available compilers, installation programs, compression/decompression utilities, etc.), may take the form of executable code.

In some embodiments, memory 1320 may store a plurality of application modules 1322 through 1324, which may include any number of applications. Examples of applications may include gaming applications, conferencing applications, video playback applications, or other suitable applications. The applications may include a depth sensing function or eye tracking function. Application modules 1322-1324 may include particular instructions to be executed by processor(s) 1310. In some embodiments, certain applications or parts of application modules 1322-1324 may be executable by other hardware modules 1380. In certain embodiments, memory 1320 may additionally include secure memory, which may include additional security controls to prevent copying or other unauthorized access to secure information.

In some embodiments, memory 1320 may include an operating system 1325 loaded therein. Operating system 1325 may be operable to initiate the execution of the instructions provided by application modules 1322-1324 and/or manage other hardware modules 1380 as well as interfaces with a wireless communication subsystem 1330 which may include one or more wireless transceivers. Operating system 1325 may be adapted to perform other operations across the components of electronic system 1300 including threading, resource management, data storage control and other similar functionality.

Wireless communication subsystem 1330 may include, for example, an infrared communication device, a wireless communication device and/or chipset (such as a Bluetooth® device, an IEEE 802.11 device, a Wi-Fi device, a WiMax device, or cellular communication facilities), and/or similar communication interfaces. Electronic system 1300 may include one or more antennas 1334 for wireless communication as part of wireless communication subsystem 1330 or as a separate component coupled to any portion of the system. Depending on desired functionality, wireless communication subsystem 1330 may include separate transceivers to communicate with base transceiver stations and other wireless devices and access points, which may include communicating with different data networks and/or network types, such as wireless wide-area networks (WWANs), wireless local area networks (WLANs), or wireless personal area networks (WPANs). A WWAN may be, for example, a WiMax (IEEE 802.16) network. A WLAN may be, for example, an IEEE 802.11x network. A WPAN may be, for example, a Bluetooth network, an IEEE 802.15x, or some other types of network. The techniques described herein may also be used for any combination of WWAN, WLAN, and/or WPAN. Wireless communications subsystem 1330 may permit data to be exchanged with a network, other computer systems, and/or any other devices described herein. Wireless communication subsystem 1330 may include a means for transmitting or receiving data, such as identifiers of HMD devices, position data, a geographic map, a heat map, photos, or videos, using antenna(s) 1334 and wireless link(s) 1332. Wireless communication subsystem 1330, processor(s) 1310, and memory 1320 may together comprise at least a part of one or more of a means for performing some functions disclosed herein.

Embodiments of electronic system 1300 may also include one or more sensors 1390. Sensor(s) 1390 may include, for example, an image sensor, an accelerometer, a pressure sensor, a temperature sensor, a proximity sensor, a magnetometer, a gyroscope, an inertial sensor (e.g., a module that combines an accelerometer and a gyroscope), an ambient light sensor, or any other similar module operable to provide sensory output and/or receive sensory input, such as a depth sensor or a position sensor. For example, in some implementations, sensor(s) 1390 may include one or more inertial measurement units (IMUs) and/or one or more position sensors. An IMU may generate calibration data indicating an estimated position of the HMD device relative to an initial position of the HMD device, based on measurement signals received from one or more of the position sensors. A position sensor may generate one or more measurement signals in response to motion of the HMD device. Examples of the position sensors may include, but are not limited to, one or more accelerometers, one or more gyroscopes, one or more magnetometers, another suitable type of sensor that detects motion, a type of sensor used for error correction of the IMU, or some combination thereof. The position sensors may be located external to the IMU, internal to the IMU, or some combination thereof. At least some sensors may use a structured light pattern for sensing.

Electronic system 1300 may include a display module 1360. Display module 1360 may be a near-eye display, and may graphically present information, such as images, videos, and various instructions, from electronic system 1300 to a user. Such information may be derived from one or more application modules 1322-1324, virtual reality engine 1326, one or more other hardware modules 1380, a combination thereof, or any other suitable means for resolving graphical content for the user (e.g., by operating system 1325). Display module 1360 may use liquid crystal display (LCD) technology, light-emitting diode (LED) technology (including, for example, OLED, ILED, µLED, AMOLED, or TOLED), light emitting polymer display (LPD) technology, or some other display technology.

Electronic system 1300 may include a user input/output module 1370. User input/output module 1370 may allow a user to send action requests to electronic system 1300. An action request may be a request to perform a particular action. For example, an action request may be to start or end an application or to perform a particular action within the application. User input/output module 1370 may include one or more input devices. Example input devices may include a touchscreen, a touch pad, microphone(s), button(s), dial(s), switch(es), a keyboard, a mouse, a game controller, or any other suitable device for receiving action requests and communicating the received action requests to electronic system 1300. In some embodiments, user input/output module 1370 may provide haptic feedback to the user in accordance with instructions received from electronic system 1300. For example, the haptic feedback may be provided when an action request is received or has been performed.

Electronic system 1300 may include a camera 1350 that may be used to take photos or videos of a user, for example, for tracking the user's eye position. Camera 1350 may also be used to take photos or videos of the environment, for example, for VR, AR, or MR applications. Camera 1350 may include, for example, a complementary metal oxide semiconductor (CMOS) image sensor with a few millions or tens of millions of pixels. In some implementations, camera 1350 may include two or more cameras that may be used to capture 3-D images.

In some embodiments, electronic system 1300 may include a plurality of other hardware modules 1380. Each of other hardware modules 1380 may be a physical module within electronic system 1300. While each of other hardware modules 1380 may be permanently configured as a structure, some of other hardware modules 1380 may be temporarily configured to perform specific functions or temporarily activated. Examples of other hardware modules 1380 may include, for example, an audio output and/or input module (e.g., a microphone or speaker), a near field communication (NFC) module, a rechargeable battery, a battery management system, or a wired/wireless battery charging system. In some embodiments, one or more functions of other hardware modules 1380 may be implemented in software.

In some embodiments, memory 1320 of electronic system 1300 may also store a virtual reality engine 1326. Virtual reality engine 1326 may execute applications within electronic system 1300 and receive position information, acceleration information, velocity information, predicted future positions, or some combination thereof of the HMD device from the various sensors. In some embodiments, the information received by virtual reality engine 1326 may be used for producing a signal (e.g., display instructions) to display module 1360. For example, if the received information indicates that the user has looked to the left, virtual reality engine 1326 may generate content for the HMD device that mirrors the user's movement in a virtual environment. Additionally, virtual reality engine 1326 may perform an action within an application in response to an action request received from user input/output module 1370 and provide feedback to the user. The provided feedback may be visual, audible, or haptic feedback. In some implementations, processor(s) 1310 may include one or more graphic processing units (GPUs) that may execute virtual reality engine 1326.

In various implementations, the above-described hardware and modules may be implemented on a single device or on multiple devices that can communicate with one another using wired or wireless connections. For example, in some implementations, some components or modules, such as GPUs, virtual reality engine 1326, and applications (e.g., tracking application), may be implemented on a console separate from the head-mounted display device. In some implementations, one console may be connected to or support more than one HMD.

In alternative configurations, different and/or additional components may be included in electronic system 1300. Similarly, functionality of one or more of the components can be distributed among the components in a manner different from the manner described above. For example, in some embodiments, electronic system 1300 may be modified to include other system environments, such as an AR system environment and/or an MR environment.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, systems, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing various embodiments. Various changes may be made in the function and arrangement of elements without departing from the spirit and scope of the present disclosure.

Also, some embodiments were described as processes depicted as flow diagrams or block diagrams. Although each may describe the operations as a sequential process, many of the operations may be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

It will be apparent to those skilled in the art that substantial variations may be made in accordance with specific requirements. For example, customized or special-purpose hardware might also be used, and/or particular elements might be implemented in hardware, software (including portable software, such as applets), or both. Further, connection to other computing devices such as network input/output devices may be employed.

With reference to the appended figures, components that can include memory can include non-transitory machine-readable media. The term "machine-readable medium" and "computer-readable medium," as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media such as compact disk (CD) or digital versatile disk (DVD), punch cards, paper tape, any other physical medium with patterns of holes, a RAM, a programmable read-only memory (PROM), an erasable programmable read-only memory (EPROM), a FLASH-EPROM, any other memory chip or cartridge, a carrier wave as described hereinafter, or any other medium from which a computer can read instructions and/or code. A computer program product may include code and/or machine-executable instructions that may represent a procedure, a function, a subprogram, a program, a routine, an application (App), a subroutine, a module, a software package, a class, or any combination of instructions, data structures, or program statements.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms, "and" and "or" as used herein, may include a variety of meanings that are also expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean A, B, C, or a combination of A, B, and C, such as AB, AC, BC, AA, ABC, AAB, or AABBCCC.

Further, while certain embodiments have been described using a particular combination of hardware and software, it should be recognized that other combinations of hardware and software are also possible. Certain embodiments may be implemented only in hardware, or only in software, or using combinations thereof. In one example, software may be implemented with a computer program product containing computer program code or instructions executable by one or more processors for performing any or all of the steps, operations, or processes described in this disclosure, where the computer program may be stored on a non-transitory computer readable medium. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques, including, but not limited to, conventional techniques for inter-process communications, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A method for fabricating a multi-layer optical device comprising:
    measuring thickness variations within a target area of a first substrate for fabricating a first optical element of the multi-layer optical device;
    determining, based on the measuring, a thickness correction map indicating amounts of material to be removed in different regions of the target area to planarize the target area;
    planarizing the target area of the first substrate based on the thickness correction map;
    bonding the first substrate to a second substrate that comprises a second optical element fabricated thereon to form a layer stack, wherein the target area of the first substrate aligns with and is bonded to the second optical element to form a multi-layer structure; and
    singulating the multi-layer structure from the layer stack.

2. The method of claim 1, wherein planarizing the target area of the first substrate includes etching the target area of the first substrate using an ion beam or cluster ion beam that scans the target area according to a scan pattern.

3. The method of claim 2, wherein the ion beam or cluster ion beam is characterized by a spot size less than 0.5 mm.

4. The method of claim 1, wherein planarizing the target area of the first substrate includes planarizing both a top surface and a bottom surface of the target area of the first substrate.

5. The method of claim 1, wherein measuring the thickness variations within the target area of the first substrate includes measuring the thickness variations within the target area of the first substrate using an interferometer.

6. The method of claim 1, further comprising:
    measuring thickness variations within a plurality of target areas of the first substrate for fabricating a plurality of first optical elements of a plurality of multi-layer optical devices, wherein the thickness correction map indicates amounts of material to be removed in different regions of the plurality of target areas to planarize the plurality of target areas; and
    selectively planarizing the plurality of target areas of the first substrate based on the thickness correction map, wherein bonding the first substrate to the second substrate comprises aligning the plurality of target areas of the first substrate with a plurality of second optical elements on the second substrate to form a plurality of multi-layer structures.

7. The method of claim 6, further comprising singulating the plurality of multi-layer structures from the layer stack.

8. The method of claim 1, wherein, after the planarizing,
    a thickness of the target area of the first substrate is less than 600 µm;
    an area of the target area is greater than 0.1 cm$^2$; and
    a total thickness variation of the target area of the first substrate is equal to or less than 1 µm.

9. The method of claim 1, wherein the first optical element includes a waveguide layer of a multi-layer waveguide or a surface-relief grating.

10. The method of claim 1, further comprising, before singulating the multi-layer structure from the layer stack, fabricating the first optical element in the target area of the first substrate.

11. The method of claim 1, wherein bonding the first substrate and the second substrate includes bonding the first substrate and the second substrate using an optically clear adhesive (OCA).

12. A waveguide display device comprising:
    a first waveguide layer characterized by a total thickness variation (TTV) equal to or less than 1 µm and an area greater than 0.1 cm$^2$;
    a second waveguide layer bonded or laminated to the first waveguide layer and characterized by a total thickness variation equal to or less than 1 µm and an area greater than 0.1 cm$^2$;
    an input granting formed in or on the first waveguide layer or the second waveguide layer, the input grating configured to couple display light into the waveguide display device; and
    an output grating formed in or on the first waveguide layer or the second waveguide layer, the output grating configured to couple the display light out of the waveguide display device.

13. The waveguide display device of claim 12, wherein at least one of the first waveguide layer or the second waveguide layer is characterized by a total thickness variation less than 0.5 µm or a wedge angle less than 1 arcsec.

14. The waveguide display device of claim 12, wherein at least one of the first waveguide layer or the second waveguide layer is characterized by a thickness equal to or less than 500 µm.

15. The waveguide display device of claim 12, wherein a refractive index of the first waveguide layer is different from a refractive index of the second waveguide layer.

16. The waveguide display device of claim 12, wherein at least one of the input grating or the output grating comprises a surface-relief grating etched in the first waveguide layer or the second waveguide layer.

17. The waveguide display device of claim 12, further comprising an optically clear adhesive (OCA) between the first waveguide layer and the second waveguide layer.

18. An engineered substrate comprising:
an array of planarized areas, wherein each planarized area of the array of planarized areas is characterized by an area greater than 1 $cm^2$ and a total thickness variation equal to or less than 1 µm,
wherein:
a width of the engineered substrate is greater than 10 cm,
a total thickness variation of areas of the engineered substrate outside of the array of planarized areas is greater than 1 µm, and
the engineered substrate is transparent to visible light.

19. The engineered substrate of claim 18, wherein the array of planarized areas is characterized by a thickness less than 600 µm.

20. The engineered substrate of claim 18, further comprising a grating coupler formed in each planarized area of the array of planarized areas.

\* \* \* \* \*